(12) United States Patent
Venkateswaran et al.

(10) Patent No.: US 7,437,697 B2
(45) Date of Patent: Oct. 14, 2008

(54) SYSTEM AND METHOD OF CRITICALITY PREDICTION IN STATISTICAL TIMING ANALYSIS

(75) Inventors: Natesan Venkateswaran, Hopewell Junction, NY (US); Chandramouli Viswewariah, Croton-on-Hudson, NY (US); JinJun Xiong, Los Angeles, CA (US); Vladimir Zolotov, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 11/303,792

(22) Filed: Dec. 16, 2005

(65) Prior Publication Data

US 2007/0143722 A1  Jun. 21, 2007

(51) Int. Cl.
*G06F 17/50* (2006.01)
*G06F 9/455* (2006.01)

(52) U.S. Cl. ......................................................... 716/6
(58) Field of Classification Search ........................ 716/6
See application file for complete search history.

(56) References Cited

U.S. PATENT DOCUMENTS

| | | | |
|---|---|---|---|
| 5,365,463 A | 11/1994 | Donath et al. | |
| 2004/0002844 A1* | 1/2004 | Jess et al. | ........................ 703/14 |
| 2004/0243954 A1 | 12/2004 | Devgan et al. | |
| 2005/0065765 A1 | 3/2005 | Visweswariah et al. | |
| 2005/0066296 A1 | 3/2005 | Visweswariah et al. | |
| 2007/0113211 A1* | 5/2007 | Zhang et al. | .................... 716/6 |

OTHER PUBLICATIONS

Visweswariah C et al: "First -order . . . " Design Automation Conference, 2004 . Jun. 7, 2004, pp. 331-336.
Guthaus M R et al: "Gate sizing . . . " Computer-Aided Design, 2005. Nov. 6, 2005, pp. 1026-1033.
Agarwal A et al: "Circuit optimization . . . " Design Automation Conference, 2005. Jun. 13, 2005, pp. 321-324.
Chopra K et al: "Parametic yield maximization . . . " Computer-Aided Design, 2005. Nov. 6, 2005, pp. 1023-1028.
Jinjun Xiong et al: "Critically computation . . . " Design Automation Conference, 2006. Jul. 24, 2006, pp. 63-68.
Chang H et al: "Parameterized block-based . . . " Design Automation Conference, 2005. Jun. 13, 2005, pp. 71-76.

* cited by examiner

*Primary Examiner*—Paul Dinh
*Assistant Examiner*—Suresh Memula
(74) *Attorney, Agent, or Firm*—Brian Verminski; Hoffman Warnick LLC

(57) ABSTRACT

A method for determining criticality probability of an edge of a timing graph of a circuit is described. The method includes forming a directed acyclic timing graph corresponding to a circuit being timed, performing statistical timing of the circuit, for each edge of interest, defining a cutset that divides the timing graph into a plurality of parts, determining an edge slack for each edge in the cutset, computing a statistical maximum of all edge slacks in the cutset, and inferring edge criticality probabilities of each edge from the statistical maximum. A system for determining criticality probability of an edge of a timing graph of a circuit is also described.

4 Claims, 23 Drawing Sheets

SYSTEM AND METHOD OF CRITICALITY PREDICTION IN STATISTICAL TIMING ANALYSIS

FIELD OF THE INVENTION

This invention relates to design automation of digital integrated circuits. More specifically, it relates to statistical static timing analysis of digital circuits in the presence of delay variations.

BACKGROUND OF THE INVENTION

Variability is observed to proportionately increase with each succeeding generation of integrated circuit technology. Sources of such variability include, for example, manufacturing variations, device fatigue, environmental variations (such as temperature and power-supply voltage), and phase-locked loop (PLL) variations. In the presence of such variations, it is desirable to know the criticality of each signal propagation arc (e.g., timing arc) i.e., the probability of manufacturing an integrated circuit (e.g., chip) with a critical path going through a signal propagation arc of interest. Various applications can benefit from such a capability, including testing, timing reports, and circuit optimization.

Prior-art "deterministic" timing methods carry out the timing at a fixed process comer or "case." Therefore, it can be difficult to predict probability distributions of circuit delay and criticalities of signal propagation arcs. Furthermore, in deterministic timing methods, the critical path is unique and is therefore the obvious target of improvement in optimization methods. In statistical timing, each path and each edge are observed to have some non-negative probability of being critical. It is desirable to predict these edge criticality probabilities in magnitude order to guide manual or automated optimization of integrated circuits.

Prior-art methods of predicting criticality probabilities suffer from such problems as inefficiency and inability to correctly take correlations into account. One way of computing criticalities is to apply Monte-Carlo simulation in a straightforward manner, by generating many random combinations of process parameters satisfying the given probability distributions, and then performing repeated deterministic timing analysis to detect the critical timing arcs for each individual combination of the process parameters. The fraction of circuits in which a particular edge is on the most critical path is the criticality probability of that edge. This approach, however, can be too computationally inefficient as it requires too many deterministic timing analyses.

Another prior-art method using parameterized statistical static analysis is described in U.S. patent application Ser. No. 10/666,470, entitled "System and Method for Probabilistic Criticality Prediction of Digital Circuits," filed on Sep. 19, 2003, the entire contents of which are incorporated herein by reference. However, this approach implicitly assumes that "tightness probabilities" are independent probabilities. This assumption has disadvantages as the tightness probabilities can be strongly correlated due to both reconvergence of the signal propagation paths and dependence on common global sources of variation, leading to inaccurate prediction of criticality probabilities.

Accordingly, there is a need to overcome the above-noted problems.

The following United States Patent Applications relating to statistical timing analysis of digital circuits are commonly assigned to the assignee herein and are incorporated by reference herein in their entireties: U.S. patent application Ser. No. 10/665,092, entitled "System and Method for Incremental Statistical Timing Analysis of Digital Circuits," filed on Sep. 18, 2003; U.S. patent application Ser. No. 10/666,353, entitled "System and Method for Statistical Timing Analysis of Digital Circuits," filed on Sep. 19, 2003; and U.S. patent application Ser. No. 10/666,470, entitled "System and Method for Probabilistic Criticality Prediction of Digital Circuits," filed on Sep. 19, 2003.

SUMMARY OF THE INVENTION

Aspects of the invention relate to a system and method for criticality prediction in digital circuits. Specifically, aspects of the invention disclose a method for computing the criticality probability of each edge of a timing graph during parameterized statistical static timing analysis (SSTA).

In one aspect, a method for determining criticality probability of an edge of a timing graph of a circuit is described. The method includes forming a directed acyclic timing graph corresponding to a circuit being timed, performing statistical timing of the circuit, for each edge of interest, defining a cutset that divides the timing graph into a plurality of parts, determining an edge slack for each edge in the cutset, computing a statistical maximum of all edge slacks in the cutset, and inferring edge criticality probabilities of each edge from the statistical maximum.

In another aspect, a system for predicting criticality in statistical timing analysis of a circuit includes means for forming a directed acyclic timing graph corresponding to a circuit being timed, means for performing statistical timing of the circuit, for each level of the timing graph, means for defining a cutset that divides the timing graph into a plurality of parts, means for determining an edge slack for each edge in the cutset, means for computing a statistical maximum for all edge slacks in the cutset, and means for inferring edge criticality probabilities of each edge from the statistical maximum.

In a further aspect, a method for deploying an application for optimizing timing characteristics of a circuit includes providing a computer infrastructure being operable to form a directed acyclic timing graph corresponding to a circuit being timed; perform statistical timing of the circuit; for each edge of interest, define a cutset that divides the timing graph into a plurality of parts; determine an edge slack for each edge in the cutset; compute a statistical maximum for all edge slacks in the cutset; and infer edge criticality probabilities of each edge from the statistical maximum.

BRIEF DESCRIPTION OF THE DRAWINGS

Preferred embodiments of the invention are described below with reference to the following accompanying drawings.

DETAILED DESCRIPTION OF PREFERRED EMBODIMENTS

Aspects of the invention describe a system and method for predicting criticality of signal propagation arcs in statistical timing analysis of a digital circuit. The criticality of a signal propagation arc is the probability of the arc being critical (i.e., the probability of manufacturing a chip in which a timing arc belongs to a timing-critical signal propagation path).

Figure 1:
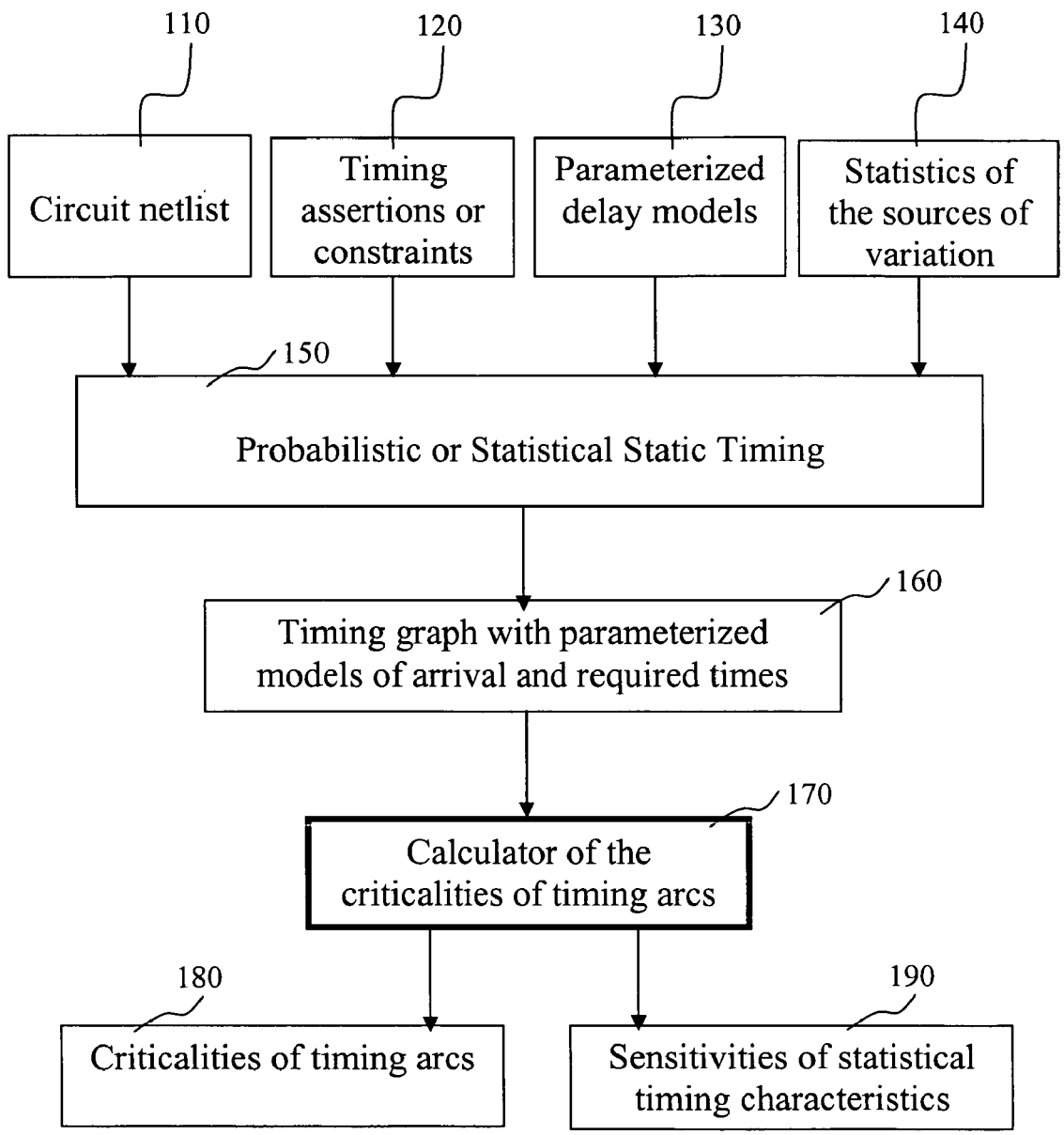
FIG. 1 is a block diagram schematic of a statistical static timing analysis system in accordance with an embodiment of the invention.

FIG. 1 is a schematic block diagram of a statistical static timing analysis system 100 in accordance with an embodiment of the invention. System 100 is alternatively referred to herein as tool 100. System 100 is configured to receive a plurality of inputs 110, 120, 130, 140. The first input is a circuit netlist 110 representing the structure of a circuit to be analyzed. The second input is a set of timing assertions 120 (e.g., timing constraints). The timing assertions 120 typically include arrival times at the primary inputs, required arrival times at primary outputs, information about phases of a clock, and details of external loads driven by the primary outputs. The timing assertions 120 can be in the form of deterministic numbers or independent probability distributions or correlated probability distributions or any combination thereof.

The third input is a set of parameterized delay models 130 which allow a timer to determine the delay of a gate or wire as a function of delay-model variables (e.g., input slew or rise/fall time, and output load) as well as a function of sources of variation. For example, a first-order linear model as described in a co-pending application "System and Method for Statistical Timing Analysis of Digital Circuits" having application Ser. No. 10/666,353 can be used to determine the delay. The system 100 is configured to receive information about the statistics of sources of variation 140. The sources of variation 140 typically include a list of the sources of variations with a mean value and standard deviation for each source of variation.

The probabilistic or statistical static timing module 150 is configured to receive inputs 110, 120, 130, 140 to generate the timing graph of the circuit annotated with parameterized first-order models 160 of arrival and required times (e.g., output 160) at all the nodes of a circuit. The parameterized first-order models 160 can be in the form of a first-order linear model.

The timing graph annotated with parameterized models of the arrival and required times 160 is received by unit 170 which is configured to calculate criticalities of timing arcs. The unit 170 computes the criticalities of timing arcs 180. The criticalities of the timing arcs 180 indicate the criticality probabilities of the timing arcs in a manufactured chip. For example, a criticality of a timing arc A provides the probability of manufacturing a chip in which the timing arc A is on a timing-critical signal propagation path.

Figure 2:
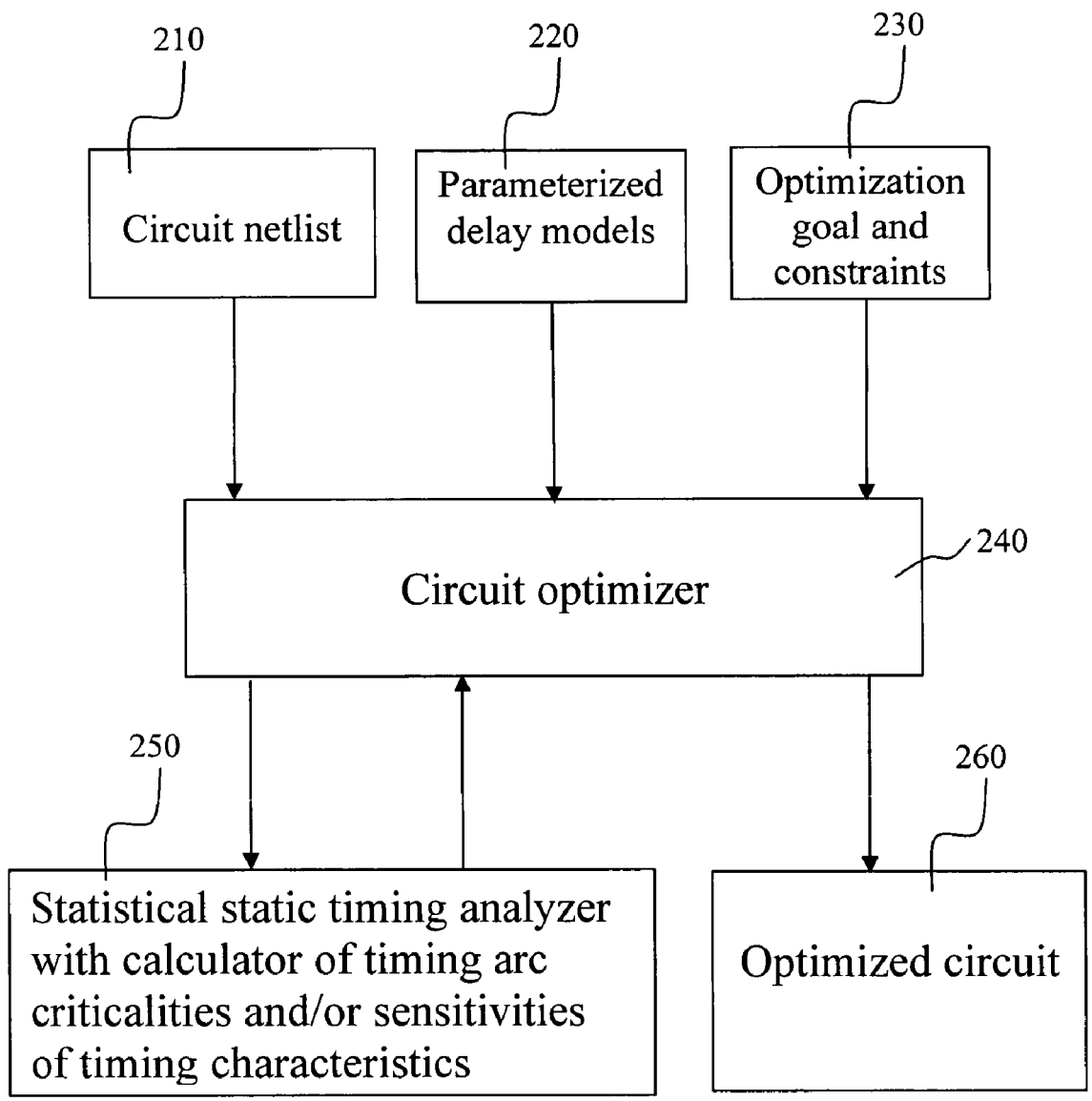
FIG. 2. is a schematic of a circuit optimization system driven by criticalities of timing arcs.

FIG. 2. is a schematic of a circuit optimization system 200 driven by criticalities of timing arcs in accordance with an embodiment of the invention. The system 200 includes a circuit optimization module 245, and a static timing analyzer 255. The circuit optimization module 245 is configured to receive as inputs a circuit netlist 210, a set of timing assertions 215, parameterized delay models 220, statistics of the source of variation 225, library of cells 230, optimization constraints 235, optimization goal 240.

The circuit netlist 210 represents the structure of a circuit to be optimized.

The set of timing assertions 215 typically include arrival times at the primary inputs, required arrival times at the primary outputs, information about the phases of the clock, and details of the external loads driven by the primary outputs. The assertions 215 can be in the form of deterministic numbers or independent probability distributions or correlated probability distributions, or a combination thereof where appropriate.

The set of parameterized delay models 220 enable the static timing analyzer 255 to determine the delay of a gate or wire as a function of delay-model variables (e.g., input slew or rise/fall time, and output load) as well as a function of sources of variation. For example, a first-order linear model as described in a co-pending application "System and Method for Statistical Timing Analysis of Digital Circuits" having application Ser. No. 10/666,353 can be used to determine the delay.

Information about the statistics of the sources of variation 225 typically has a list of the sources of variation with a mean value and standard deviation for each source of variation.

The library of cells 230 are used by the optimizer 245 to replace select cells of the circuit netlist 210. This replacement can be a part of optimization transformations.

The optimization constraints 235 can include, for example, timing constraints, leakage and switching power constraints, signal slope constraints, area constraints and noise constraints.

The optimization goal 240 specifies the goal that the optimizer 245 is desired to achieve. For example, the optimization goal can be to minimize the chip area or power, to maximize manufacturing yield or performance, etc.

The circuit optimizer 245 accepts the various inputs to produce an optimized circuit 260 that can be in the form of a netlist or database. The optimized circuit 260 includes the characteristics specified by the optimization goal 240 and satisfies the optimization constraints 235. The optimized circuit 260 may differ from the circuit specified by the netlist 210. The differences, for example, can be in terms of sizes or types of its cells, or topology.

During optimization, the optimizer 245 interacts with the static timing analyzer 255 to estimate circuit timing characteristics. Additionally, the optimizer 245 interacts with a calculator of timing arc criticalities 250 to select appropriate cells of a circuit as candidates for changing the cell size, cell type, or other optimization transformations of the cells of the circuit. It is to be understood that optimization may be of a discrete or continuous type, and that certain custom circuit designs may or may not be composed of library cells. One of ordinary skill in the art would be able to create variants of the invention that can be applied to these various optimization scenarios.

In order to compute criticalities of timing arcs, the following definitions are used, where appropriate, through this specification:

Digital systems typically operate on the basis of a circuit performing some computation in each clock cycle or "tick." In a certain clock cycle, a given signal may not switch, may switch once, or may switch many times, depending on the inputs applied to the circuit. Within each clock cycle, for each and every signal in the system, it is desirable to ensure correct timing (e.g., the early mode arrival time or "early arrival time," and the late mode arrival time or "late arrival time").

The early mode arrival time is defined as the earliest time at which a signal could possibly switch (e.g., change from a stable logical state at which it was during the previous clock cycle). The early mode arrival time ensures that the previous cycle "settled down" and recorded correct logic values before the logic values changed or switched during a current clock cycle. The earliest time at which the signal is allowed to switch and still let the circuit function as desired is referred to as the "early required time."

The late mode arrival time is defined as the latest time at which a signal stops switching to become stable. This ensures that the circuit has completed its function in the desired time to meet clock cycle constraints. The latest time at which the signal is desired to stop switching and become stable at its final stable logical state to allow correct functioning of the circuit is called the "late required time."

In late mode, the algebraic difference between the required time and the arrival time is defined as "late timing slack." Likewise, in early mode, the algebraic difference between the arrival time and the required time is called "early timing slack."

Timers compute arrival times by "forward propagation" of timing values through a timing graph, and the required times are computed by "backward propagation" of timing values through a timing graph.

For brevity, the present description is limited to the computation of late mode timing quantities (e.g., late arrival time and late required time). However, it will be appreciated that the presented techniques and methods of computing criticalities can be extended to early mode timing quantities (e.g., early arrival time and early required time).

A timing graph is a model of a digital circuit. Vertices of the timing graph correspond to nodes of the circuit modeled by the timing graph. Arcs of a timing graph or "timing arcs" connect vertices. The timing arcs are directed and model signal propagation from one circuit node to another. Each timing arc is assigned a propagation delay. The delay is equal to the signal propagation time from the initial vertex of the timing arc to its terminal vertex. Two nodes of the timing graph can have a special meaning—a source node where all the signals start, and a sink node which is the destination of all the circuit signals. For a circuit having one primary input and one output, the source node is the primary input of the circuit and the sink node is the primary output of the circuit. For circuits with a plurality of primary inputs and outputs, the source and sink nodes are introduced additionally to the actual nodes of the circuit for convenience during analysis. Accordingly, the source node is connected to all the primary inputs of the circuit and the sink node is connected to all the primary outputs of the circuit.

A path of a timing graph having vertices with minimum timing slack is defined as a critical path. For example, if the circuit is designed to work at higher speeds, signal propagation through the critical path may also have to be made faster. Inventors have observed that speeding up a non-critical path may not contribute to operating the circuit faster as timing arcs belonging to the critical path are said to be critical. The circuit can be designed to operate faster by reducing delays of select critical arcs. Small changes in delays of non-critical arcs appear not to affect circuit performance. Therefore, for circuit optimization, it is desirable to identify critical timing arcs of the circuit. For effective manufacturing test of integrated circuits, it is useful to know the critical timing arcs of the chip. Other areas of Electronic Design Automation such as placement, routing, buffer insertion and physical synthesis can benefit from knowing criticalities of timing arcs.

Figure 3:
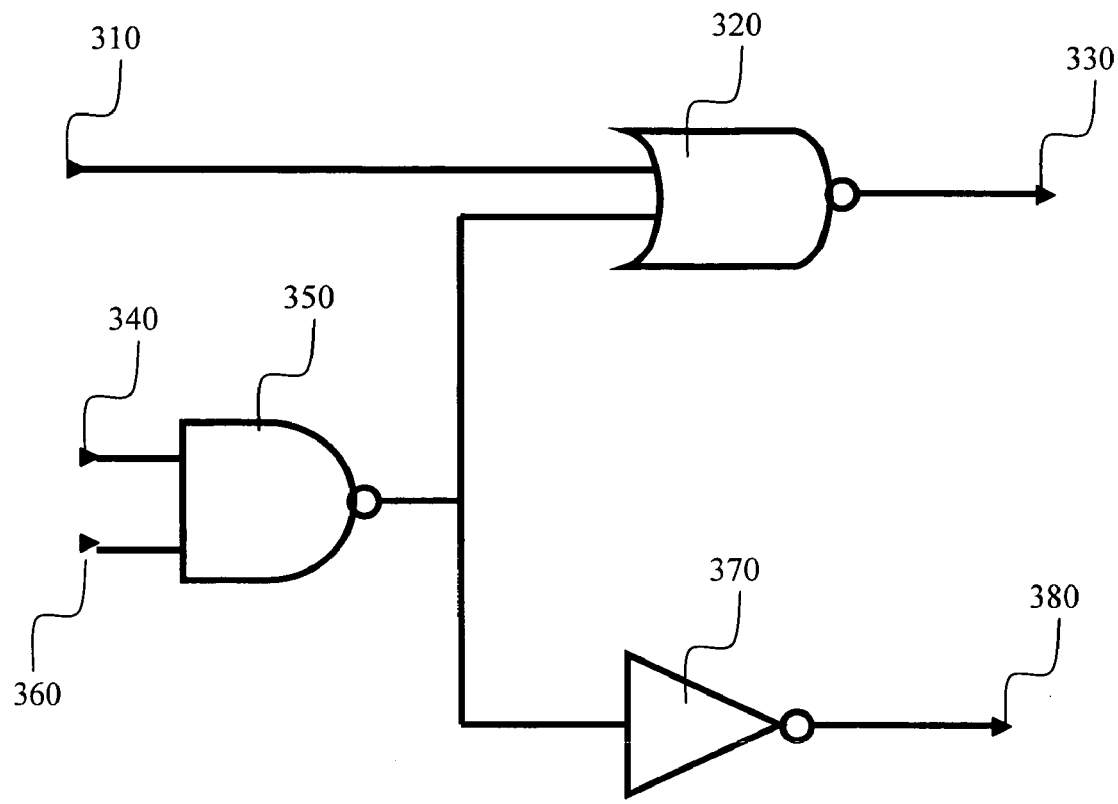
FIG. 3 is an example of a digital circuit provided to describe terminology described with respect to FIGS. 1-2.

FIG. 3 is an example of a sample digital circuit provided to describe terminology described with respect to FIGS. 1-2. A digital circuit 300 has gates 320, 350 and 370. The circuit 300 has primary inputs 310, 340 and 360, and primary outputs 330 and 380.

Figure 4:
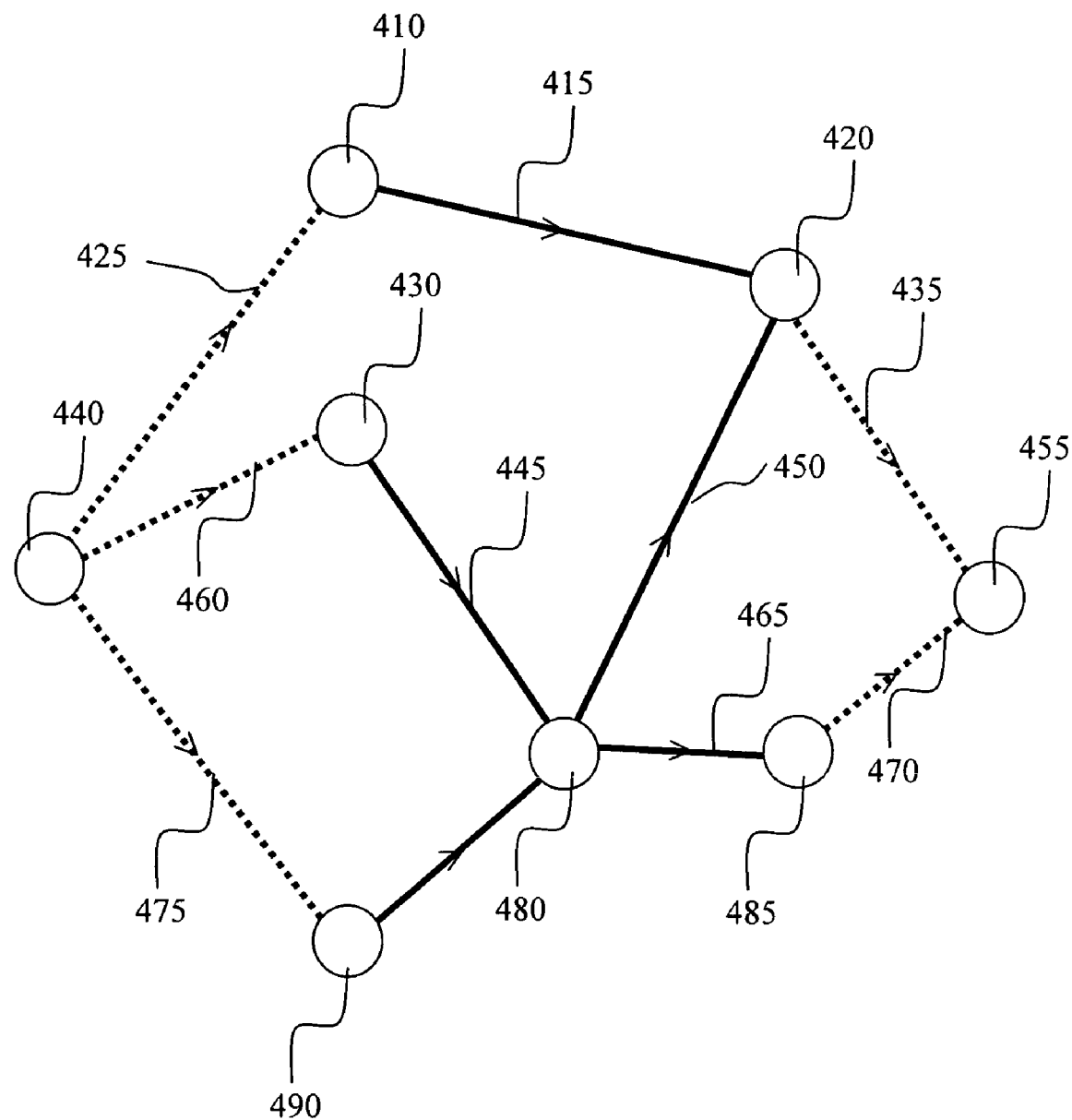
FIG. 4 shows a timing graph modeling the exemplary circuit shown in FIG. 3.

FIG. 4 shows a timing graph 400 modeling the sample circuit 300 shown in FIG. 3. The timing graph 400 includes a source node 440 and a sink node 455. Nodes 410, 430, 490 correspond to the primary circuit inputs 310, 340 and 360 of FIG. 3. Nodes 420 and 485 correspond to the primary outputs 330 and 380 of FIG. 3. The nodes 420, 480 and 485 correspond to the outputs of gates 320, 350 and 370 of FIG. 3. Arcs 425, 460, 475 are the timing arcs connecting the source node 440 with the nodes 410, 430, 490, respectively. Arcs 435 and 470 are timing arcs connecting the nodes 420, 485 to the sink node 455. A signal propagates from the source node 440 to the sink node 455 through all the timing arcs according to the delays assigned to the timing arcs.

In an embodiment where all the gate propagation delays are deterministic values, all the arrival and required times are deterministic values too. However if manufacturing and/or environmental variability are modeled, the delays of the timing arcs should be considered as random variables described with their corresponding probability distribution functions. Then a statistical timing analysis should be used for computing the probability distributions of the arrival times, required times and timing slacks.

Parameterized statistical static timing analysis (SSTA) is useful for circuit analysis and optimization. According to this technique, gate delays are represented as a first-order linear model:

$$A = a_0 + \sum_{i=1}^{n} a_i \Delta X_i + a_{n+1} \Delta R_a \tag{1}$$

where: $a_o$ is a mean value; $\Delta X_i$ is a variation of global parameter $X_i$, $\Delta X_i = X_i - X_{i,0}$ where $X_{i,0}$ is the mean value of $X_i$; $a_i$ is the sensitivity of the gate delay to parameter variation $\Delta X_i$; $\Delta R_a$ is a random variable responsible for uncorrelated variation of the gate delays; and $a_{n+1}$ is a sensitivity of the gate delay to uncorrelated variation $\Delta R_a$.

Using the representation shown in equation (1), parameterized SSTA computes a statistical approximation of the circuit timing characteristics (e.g., arrival and required arrival times, delay, timing slack) as functions of the same parameters in the form of the same first-order linear model.

The parameterized statistical STA can be either path-based or block-based. Path-based statistical STA analyzes each signal propagation path separately and computes the probability distribution of the circuit delay as the probabilistic maximum of all paths delays. Usually this requires enumeration of all signal propagation paths and integration in the space of parameter variations, which is an inefficient computational procedure.

Another technique of parameterized SSTA is block-based SSTA. In this technique signal arrival times and signal required arrival times are computed as functions of process parameters for each circuit node in their topological order, in a similar fashion as arrival times are propagated by a deterministic STA. Using block-based SSTA, timing analysis can be performed as an incremental operation, whereby after changes of the circuit are implemented, timing can be efficiently queried.

Block-based STA computes arrival times at each circuit node by incrementing arrival time by a gate delay and computing worst-case arrival time. The incrementing of the arrival time by a gate delay corresponds to propagating signals from a gate input to its output. This operation is performed by summation of the arrival time at the gate input and gate delay. Computation of worst-case arrival time selects the worst-case signal from the signals arriving at a gate's inputs. The worst signal can be the latest or the earliest one depending on the type of timing analysis.

Figure 5:
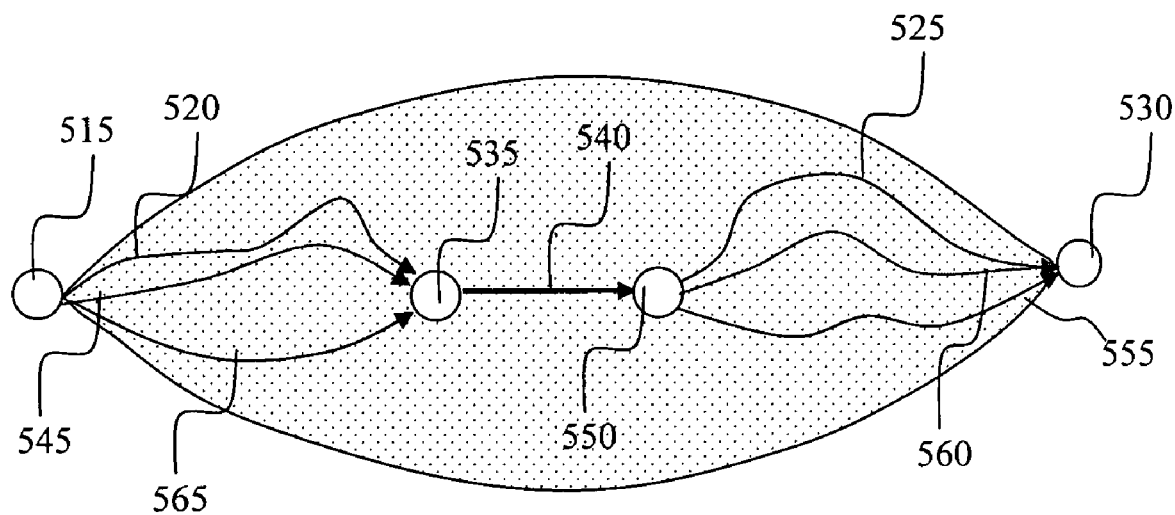
FIG. 5 is a schematic illustrating criticalities of a timing arc and signal propagation paths of a timing graph for the digital circuit shown in FIG. 3.
Figure 6:
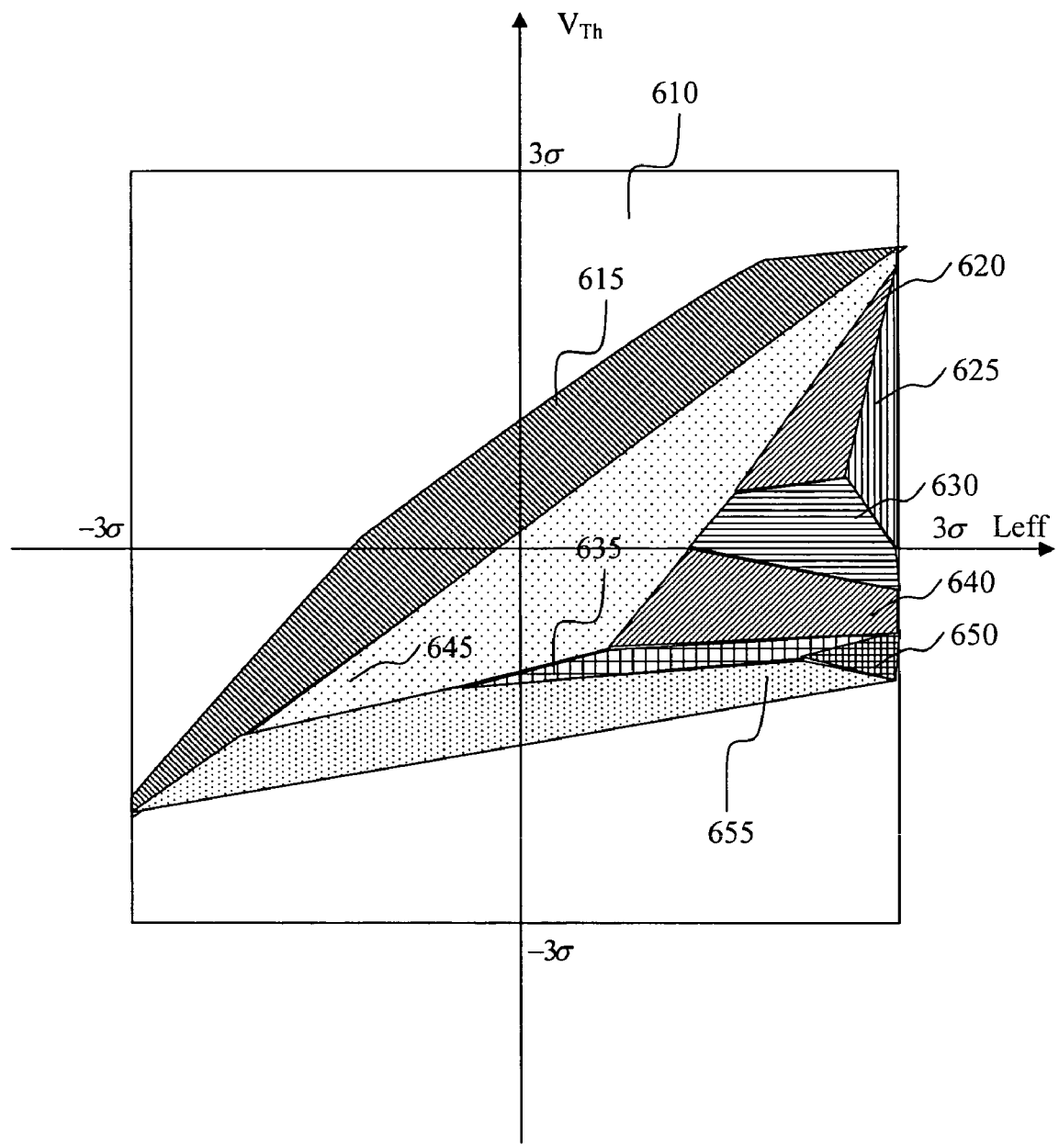
FIG. 6 shows a variation space with criticality regions of paths going through a timing arc as shown in FIG. 5.

The proposed methodology for computing criticalities of timing arcs is based on observations made by the inventors who observed that the criticality of a timing arc is a sum of criticalities of all the signal propagation paths going through the timing arc as illustrated in FIGS. 5 and 6.

FIG. 5 is a schematic illustrating criticalities of a timing arc and signal propagation paths of a sample timing graph. Specifically, FIG. 5 shows a timing graph 500 with a source node 515 and a sink node 530. From the timing graph 500, an arbitrary timing arc 540 having an initial vertex 535 and terminal vertex 550 is selected. Paths 520, 545 and 565 extend from the source node 515 to the initial node 535 of the timing arc 540. Paths 525, 555 and 560 extend from the terminal node 550 of the timing arc 540 to the sink node 530. The various paths going through the timing arc 540 are all possible combinations of the paths 520, 545 and 565, the timing arc 540 itself, and the paths 525, 555 and 560. The dotted region of timing graph 500 is indicative of many more nodes and arcs in the timing graph that are not explicitly shown for the sake of simplicity.

The delay of each path can be expressed in the first-order linear model of equation (1). Consider two paths $S_k$ and $S_j$ and the first-order linear models of their delays:

$$D_k = a_{0,k} + \sum_{i=1}^{n} a_{i,k} \Delta X_i + a_{n+1,k} \Delta R_{a,k} \quad (2)$$

$$D_j = a_{0,j} + \sum_{i=1}^{n} a_{i,j} \Delta X_i + a_{n+1,j} \Delta R_{a,j}$$

where: $a_{o,k}$, $a_{o,j}$ are mean values of the delays; $\Delta X_i$ is a variation of parameter $X_i$, $\Delta X_i = X_i - X_{i,0}$ where $X_{i,0}$ is the mean value of $X_i$; $a_{i,k}$, $a_{i,j}$ are the sensitivities of the paths' delays to the parameter variation $\Delta X_i$; $\Delta R_{a,k}$, $\Delta R_{a,j}$ are random variables responsible for uncorrelated variation of the path delays; and $a_{n+1,k}$, $a_{n+1,j}$ are sensitivities of the path delays to uncorrelated variations $\Delta R_{a,k}$, $\Delta R_{a,j}$, respectively. The probability that the delays $D_k$ and $D_j$ (considered as random variables) have the same exact value is 0 unless $$a_{0,k} = a_{0,j}$$

$$a_{i,k} = a_{i,j}$$

$$a_{n+1,k} = a_{n+1,j} = 0 \quad (3)$$

Then the probability that at least one of the two paths $S_k$ and $S_j$ is critical is a sum of the individual probabilities that each path is critical:

$$P(S_k \text{ or } S_j \text{ is critical}) = P(S_k \text{ is critical}) + P(S_j \text{ is critical}) \quad (4)$$

If equation (3) is valid, then the paths $S_k$ and $S_j$ can have same delays. Then if one of the paths $S_k$ and $S_j$ is critical, the other one is critical too. A criticality value can be assigned to each path $S_k$ and $S_j$ as shown in equation (5).

$$P(S_k \text{ is critical}) = P(S_j \text{ is critical}) = P(S_k \text{ or } Sj \text{ is critical})/2 \quad (5)$$

It can be seen that equation (4) is also valid for equation (5).

Concepts illustrated in equation (5) can be extended from a pair of paths to any number of them. That is, the probability that at least one path of a set of paths $\{S_1, S_2, \ldots, S_n\}$ is critical is equal to the sum of the individual probabilities of each of these paths being critical:

$$P_{Set,Crit} = \sum_{i=1}^{n} P(S_i \text{ is critical}) \quad (6)$$

From this, it follows directly that the criticality of a timing arc is the sum of the criticalities of all the paths going through that arc as shown in FIG. 6.

FIG. 6 shows a variation space with criticality regions of paths going through a timing arc as shown in the sample timing graph of FIG. 5. Specifically, FIG. 6 schematically illustrates a space 610 of two sample parameter variations: effective channel length $L_{eff}$ and transistor threshold $V_{Th}$. The space 610 covers variations of $L_{eff}$ and $V_{th}$ from $-3\sigma$ to $3\sigma$. Each point of the space 610 corresponds to one combination of $L_{eff}$ and $V_{th}$. Polygons 615, 620, 625, 630, 635, 640, 645, 650, 655 represent the regions of process parameter combinations at which the paths going trough the timing arc 540 (FIG. 5) of the timing graph 500 are critical. Each of the polygonal regions corresponds to one of the 9 paths going through the arc 540. It will be appreciated that the timing graph of FIG. 5 is exemplary and shown for illustration in better understanding the aspects of the invention. In a preferred embodiment, the polygonal regions can only border with each other but never intersect because the paths delays are different linear functions of process parameters. The union of all the polygons 615, 620, 625, 630, 635, 640, 645, 650, 655 is the region of the process parameter combination in which the timing arc 540 is critical because the timing arc is critical if at least one of the paths going through the arc 540 is critical.

Computation of timing arc criticalities can be simplified if a set of timing arcs belonging to a cutset of a timing graph is considered. A cutset of a connected graph is defined as any set of arcs whose deletion from the graph cuts the graph into two disconnected components. A proper (or minimal) cutset is a cutset such that any proper subset of the cutset is not itself a cutset.

In order to simplify computation of timing arc criticalities, consider only proper cutsets that separate a timing graph into two parts, one of which contains the source vertex and the other the sink vertex. Further, consider only cutsets satisfying the following property:

If a cutset C divides a timing graph into two components F and G such that the component F contains the source vertex and the component G contains the sink vertex, then an initial vertex of any cutset arc belongs to the component F and the terminal vertex of any cutset arc belongs to the component G. In other words, arcs of all the cutsets arcs are directed from the component containing the source vertex to the component containing the sink vertex. For simplicity, the proper cutsets are referred to in the description to follow as "cutsets."

A timing graph is a directed acyclic graph (DAG) and the vertices of a DAG always can be sorted topologically (e.g., the DAG is ordered so that each arc is going from a vertex with a lower index to a vertex with a higher index).

If a timing graph has a cutset C, then any path going from the source vertex to the sink vertex of the timing graph has an arc belonging to the cutset C—otherwise the source and sink vertices cannot belong to the different components of the graph.

Any path from the source vertex to the sink vertex has only one arc belonging to the cutset. Once a path goes through a cutset arc, it arrives at the component with the sink vertex and cannot return to the component with the source vertex. Therefore, this path cannot go through another arc of the cutset. Thus, it can be concluded that the probability that two timing arcs a and b of the same cutset are simultaneously critical (i.e., the probability of manufacturing a chip where both timing arcs are critical) is 0 because the arcs have different sets of paths going through them.

For any cutset of a timing graph, the sum of the criticalities of the timing arcs is always 1 as the sum represents the sum of the criticalities of all paths of the chip.

Suppose that for any timing arc $a_i$ of a given cutset C, the first-order linear model $D_{i,c}$ of the maximum delay of all the paths going through this timing arc is known. Then, the first-order model of the maximum delay D of the timing graph as the statistical maximum of all these first-order models $D_{i,C}$ can be computed as:

$$D = \max_{1 \le i \le n_C} (D_{i,C}) \quad (7)$$

where the maximum is computed in a statistical sense over all the timing arcs of the cutset C and $n_C$ is the number of edges in the cutset.

The probability $P_{i,C}$ that the maximum delay $D_{i,C}$ of the paths going though the timing arc $a_i$ is larger than the delay of any other path from the source vertex to the sink vertex is exactly the criticality of this timing arc $a_i$. This probability $P_{i,C}$ is equal to the tightness probability corresponding to the delay $D_{i,C}$ in the computation of the statistical maximum in equation (7).

Therefore, for computation of timing arc criticalities it is desirable to compute cutsets of the timing graph, the first-order model of the maximum delay of the set of paths going through each timing arc and tightness probabilities of these maximum delays expressed in the form of a first-order linear model.

Figure 7:
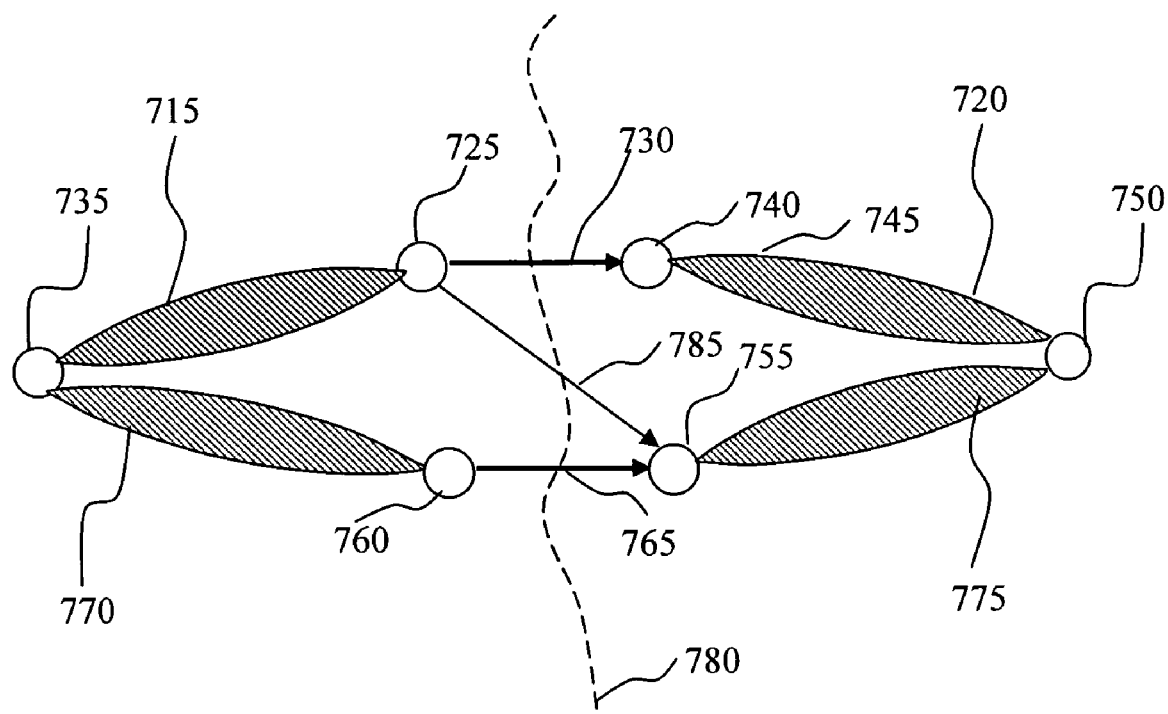
FIG. 7 shows an exemplary cutset of a timing graph.

FIG. 7 shows an exemplary cutset of a timing graph. Specifically, FIG. 7 schematically illustrates an example of a cutset 780 of a timing graph 700. The timing graph 700 has a source node 735 and a sink node 750. The cutset 780 includes timing arcs 730, 785 and 765 going from their initial nodes 725, 725 and 760 to their terminal nodes 740, 755 and 755, respectively. The set of paths 715 goes from the source node 735 to node 725. The set of paths 720 goes from node 740 to the sink node 750. The set of paths goes from the source node 735 to node 760. The set of paths 775 goes from node 755 to the sink node 750.

Figure 8:
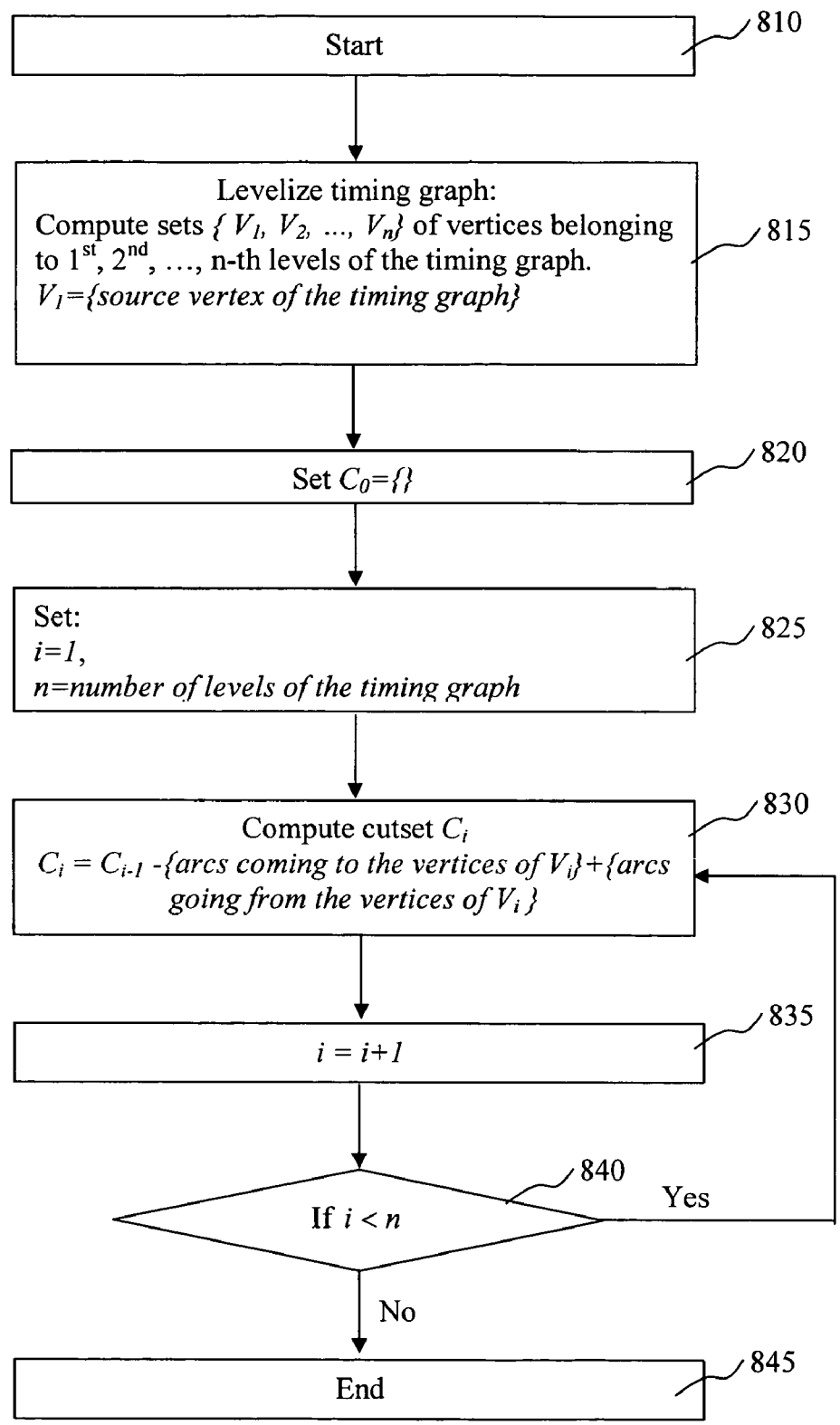
FIG. 8 is a flow methodology for computing cutsets of a timing graph for the timing graph, an example of which is shown in FIG. 4.

FIG. 8 is a flow methodology for computing cutsets of a timing graph for the timing graph, an example of which is shown in FIG. 4. Specifically, FIG. 8 illustrates a methodology 800 for constructing cutsets of a timing graph. It is to be understood that cutsets can be constructed in many different ways and the inventive concepts described herein are applicable irrespective of how the cutsets are constructed. The input to the methodology 800 is a timing graph and the output is a set of cutsets covering all the timing arcs of the timing graph.

A start block 810 passes control to a function block 815.

At a step 815, the function block 815 levelizes the timing graph. Levelization is defined as dividing a set V of the vertices of the timing graph into subsets (levels) $V_1, V_2, \ldots, V_n$, so that every timing arc goes from a vertex of a lower level to a vertex of a higher level. The levelization is used in both deterministic and statistical timing analysis and is a part of the timing analyzer (e.g., timing analyzer 255 shown in FIG. 2). Step 815 can be implemented by invoking a proper function block of the static timing analysis tool or by accessing directly the levelized timing graph built by the static timing analysis tool. Step 820 is then performed.

At a step 820, an empty set $C_0$ is constructed. Step 825 is then performed. At a step 825, the counter i of levels with the value 1 is initialized and the variable n is set to be equal to the number of levels of the timing graph. The methodology then moves to step 830.

At a step 830, the cutset $C_i$ is computed. The cutset $C_{i-1}$ is considered and from it all the arcs coming to the vertices of the level $V_i$ are deleted. Further, all the arcs going from the vertices of the level $V_i$ are added to the resulting cutset according the following formula:

$$C_i = C_{i-1} - \{\text{arcs coming to vertices of } V_i\} + \{\text{arcs going from vertices of } V_i\} \quad (8)$$

The methodology then moves to step 835.

Step 835 increments the counter of levels i by 1 and passes control to step 840.

Step 840 determines whether the counter of levels i is less than the number of levels n of the timing graph. If the counter i is less than n the decision block 840 passes control to the function block 830 or computing the next cutset of the timing graph. Otherwise, step 840 passes control to the end block 845.

Figure 9:
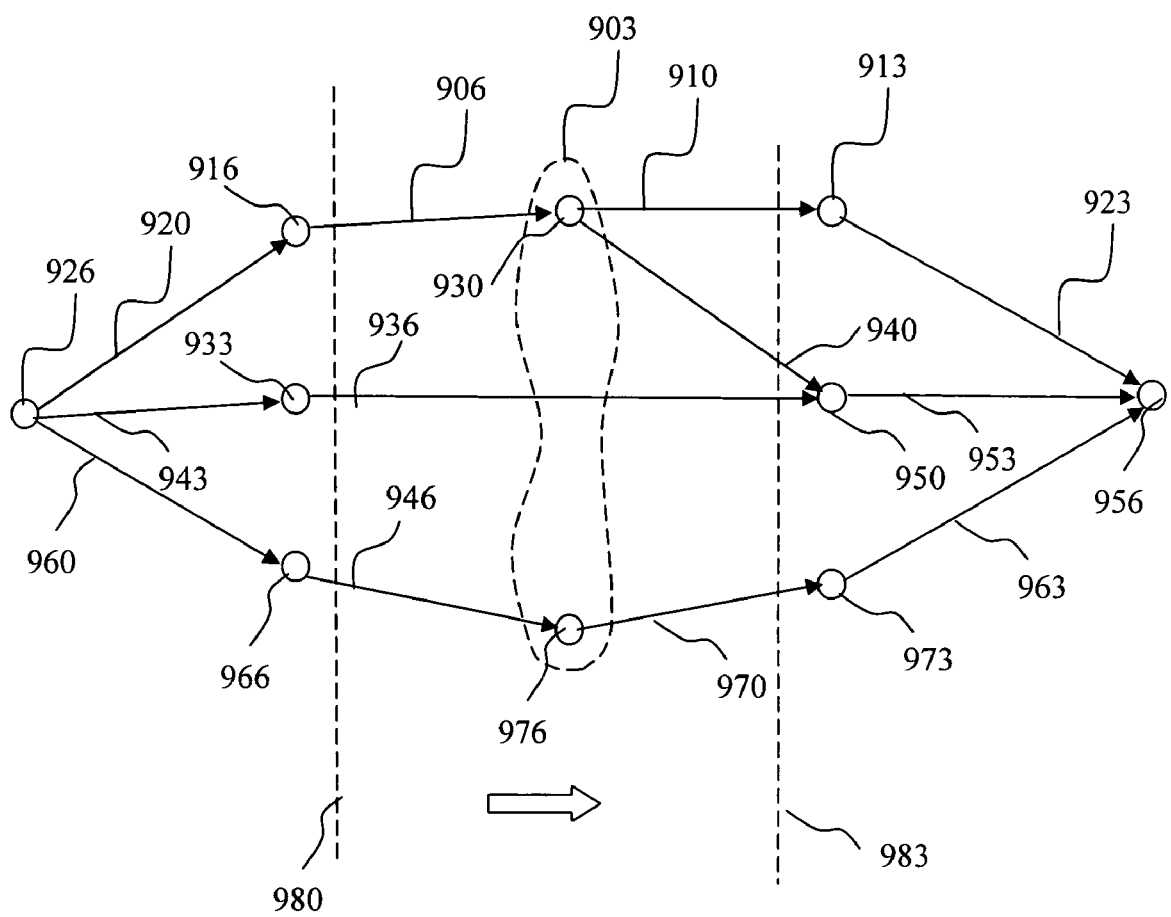
FIG. 9 illustrates computation of cutsets of an exemplary timing graph.

FIG. 9 illustrates computation of cutsets of an exemplary timing graph. Specifically, FIG. 9 explains the computation of cutsets on an example of a timing graph 900 with a source node 926 and a sink node 956. For purposes of illustration, one level 903 and two cutsets 980 and 983 of the timing graph 900 are shown. The level 903 includes vertices 930 and 976. The vertex 903 has an incoming arc 906 and outgoing arcs 910 and 940. The vertex 976 has an incoming timing arc 946 and an outgoing timing arc 970. The cutset 980 includes timing arcs 906, 936 and 946. The cutset 983 includes timing arcs 910, 940, 936 and 970. FIG. 9 shows a snapshot when the methodology 800 processes the level 903 of the timing graph 900. The methodology 800 transitions from the cutset 980 to the cutset 983. The methodology computes the cutset 983 by considering the cutset 980 having arcs 906, 936 and 946; removes from the cutset 980 the arcs 906 and 946 coming to the vertices 930, 976 of the level 903; adding the arcs 910, 940 and 970 going out of the vertices 903, 976 of the level 903, thereby generating a new cutset {936, 910, 940, 970}.

Figure 10:
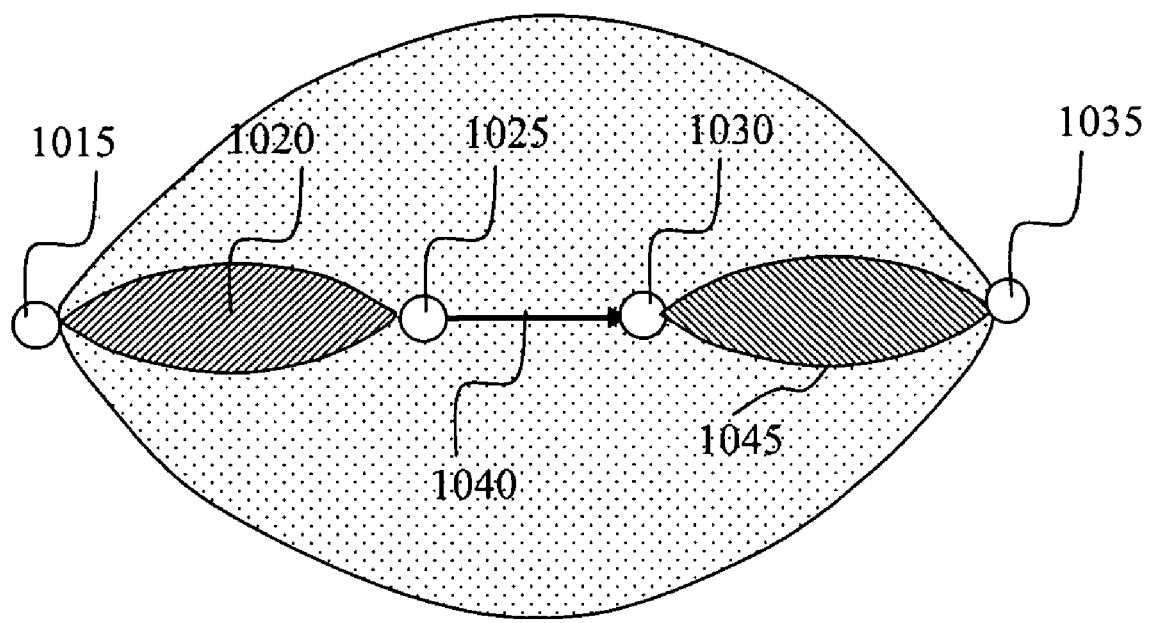
FIG. 10 illustrates computation of the maximum delay of all paths going through a timing arc.

FIG. 10 illustrates computation of the maximum delay of all paths going through a timing arc of a timing graph. The maximum delay of all paths going through an edge is called the edge slack of that edge. Specifically, FIG. 10 schematically shows a timing graph 1000 with a source vertex 1015 and a sink vertex 1035. Computing the first-order model of the maximum delay of the paths going through an arbitrarily selected timing arc 1040 is shown. The timing arc 1040 has an initial vertex 1025 and a terminal vertex 1030. A set of paths 1020 goes from the source vertex 1015 to the initial vertex 1025 of the selected timing arc 1040. A set of paths 1045 goes from the terminal vertex 1030 of the selected timing arc 1040 to the sink vertex 1035 of the timing graph. The dotted areas shown in timing graph 1000 indicate many more nodes and edges of the timing graph that are not explicitly shown.

Assuming that the parameterized statistical timing analysis has computed arrival and required times in the form of the first-order linear model and from the definition of the arrival and required times in static timing analysis, the arrival time $T_{AT,I}$ at the initial vertex 1025 of the timing arc 1040 can be concluded to be exactly the maximum delay of signal propagation from the source vertex 1015 to the initial vertex 1025. On the other hand, the required time $T_{RAT,T}$ at the terminal vertex 1030 of the timing arc 1040 is exactly the maximum delay of signal propagation from the vertex 1030 to the sink vertex 1035, but taken with a negative sign. For simplicity, it is assumed that the arrival time at the source vertex 1015 and the required time at the sink vertex 1035 are set to 0. The maximum delay $D_s$ of the set of paths going through the timing arc 1040 is the maximum delay $D_I$ from the source vertex 1015 to the initial vertex 1025 of the timing arc 1040 plus delay $D_a$ of the timing arc 1040 itself plus the maximum delay $D_T$ from the terminal vertex 1030 of the timing arc 1040 to the sink vertex 1035:

$$D_s = D_I + D_a + D_T \tag{9}$$

This delay can be expressed in terms of values of arrival and required times computed by statistical static timing analysis:

$$D_s = T_{AT,I} + D_a - T_{RAT,T} \tag{10}$$

The addition and subtraction in equations (9) and (10) are understood to be carried out in a statistical sense.

As can be seen from the above, the maximum delay of all the paths going through any timing arc of the timing graph, i.e., the edge slack of any timing arc, can be efficiently and readily computed from the results of statistical timing analysis.

Figure 10A:
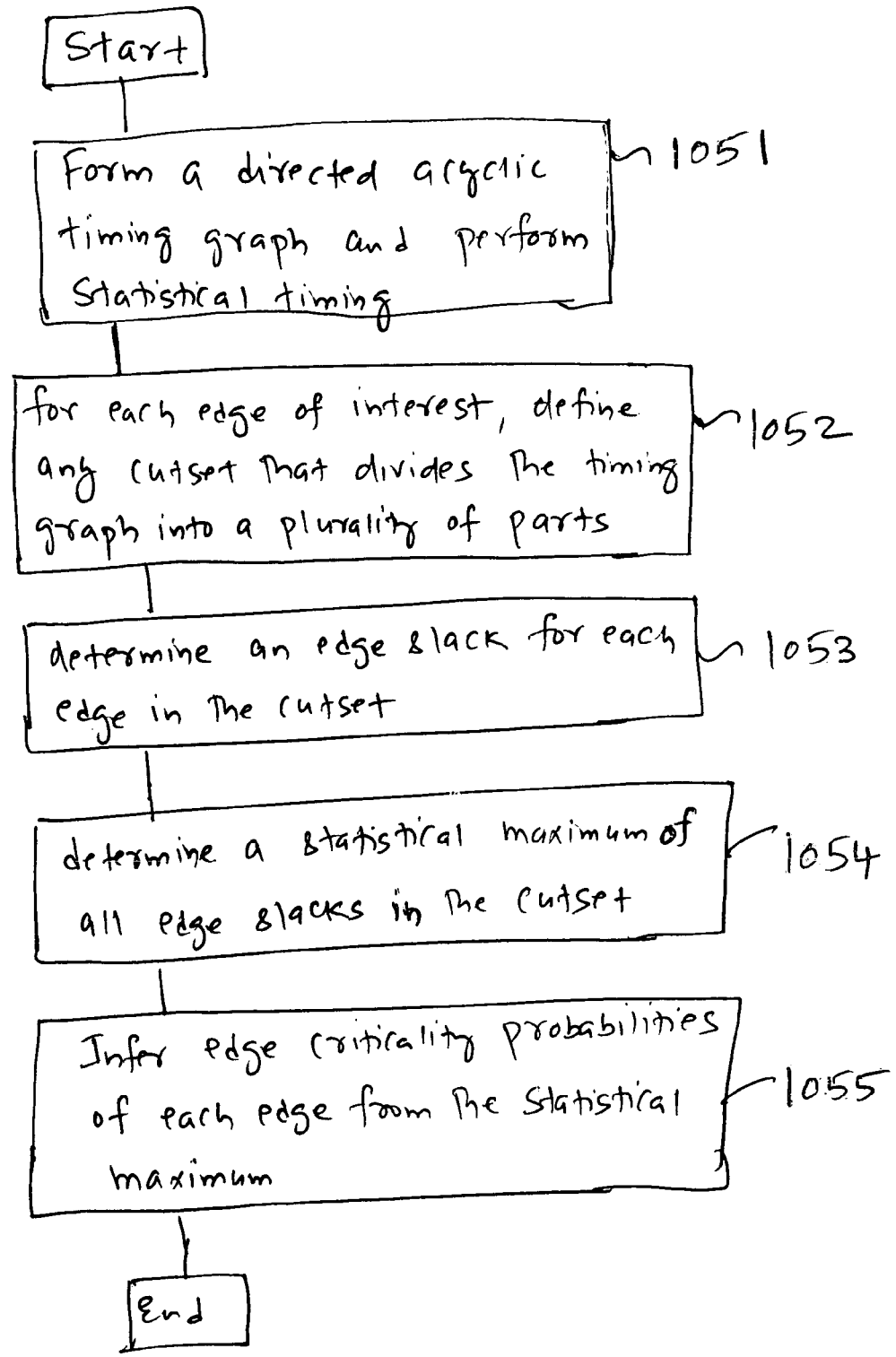
FIG. 10A is a high level flow methodology to determine criticality probability of an edge of the timing graph, an example of which is shown in FIG. 4.

FIG. 10A is a high level flow methodology to determine criticality probability of an edge of the timing graph, an example of which is shown in FIG. 4.

At a step 1051, a directed acyclic timing graph corresponding to a circuit being time is formed and statistical timing of the circuit is performed. The methodology then moves to step 802.

At a step 1052, for each edge of interest, a cutset is defined that divides the timing graph into a plurality of parts. Step 1053 is then performed.

At a step 1053, edge slack for each edge of interest in the cutset is determined. Step 1054 is then performed.

At a step 1054, a statistical maximum of all edge slacks in the cutset are determined. Step 1055 is then performed.

At a step 1055, edge criticality probabilities of each edge are inferred from the statistical maximum operation of step 1054.

Figure 11:
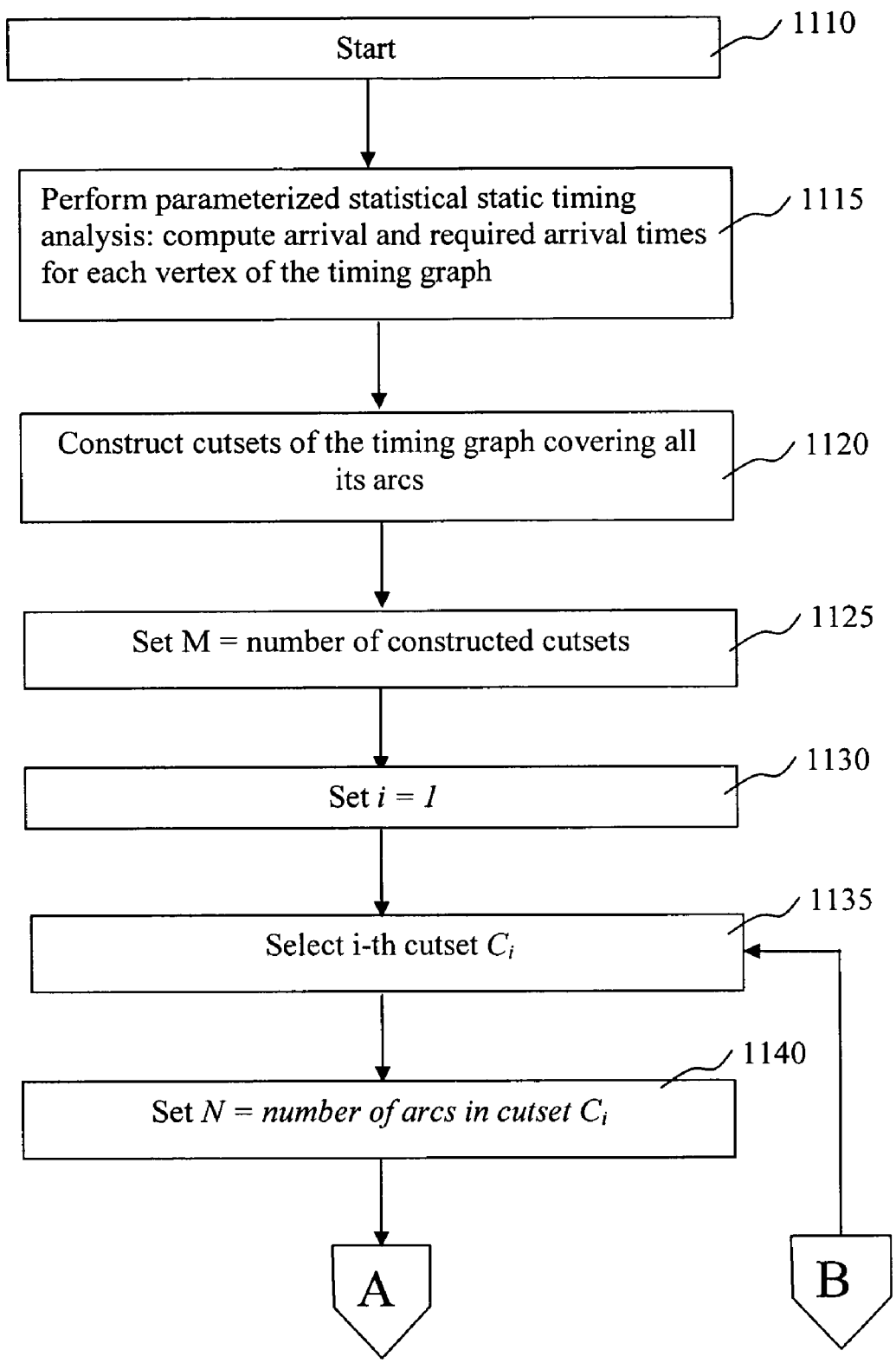
FIG. 11 is a flow chart for computing criticalities of timing arcs.
Figure 11:
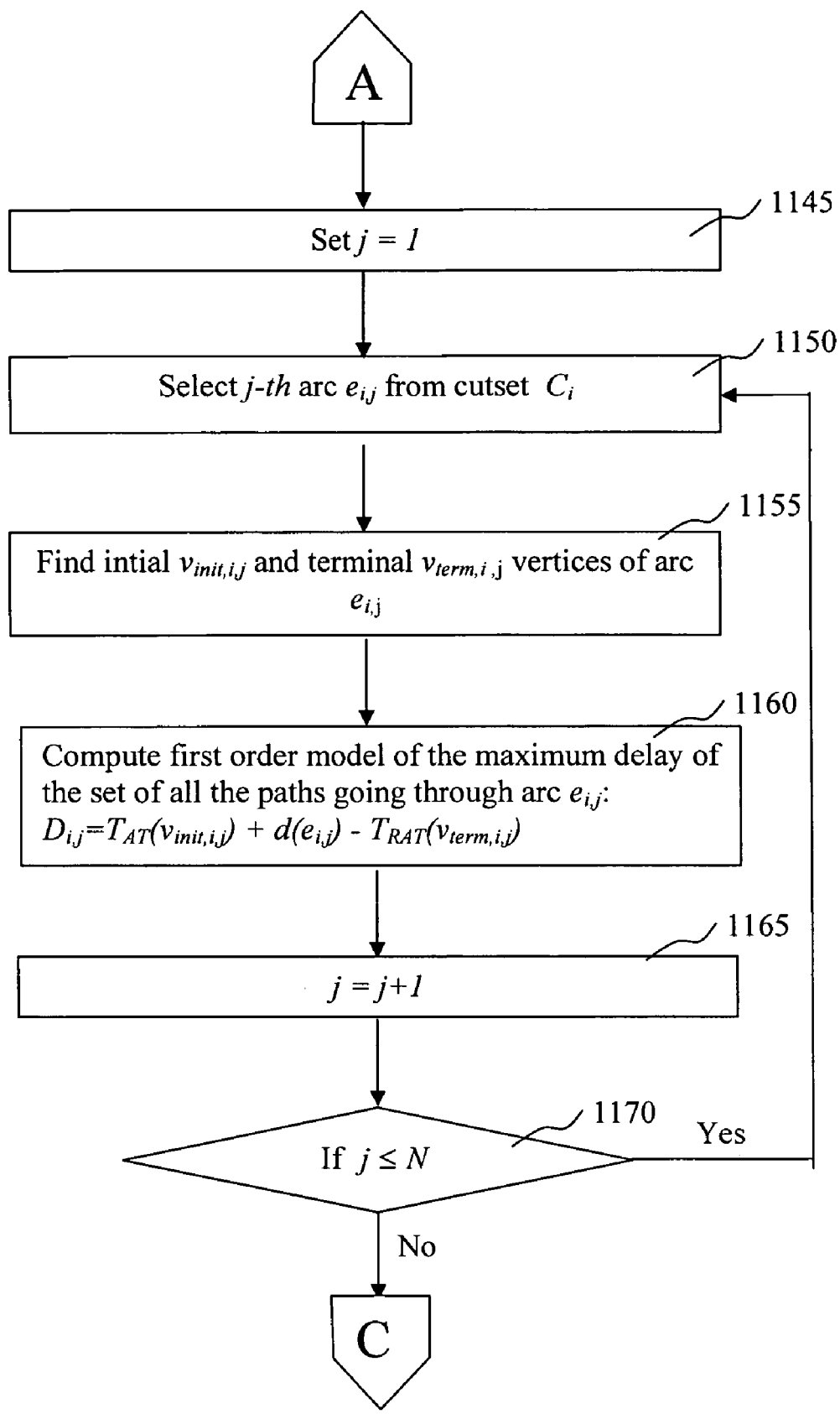
Figure 11:
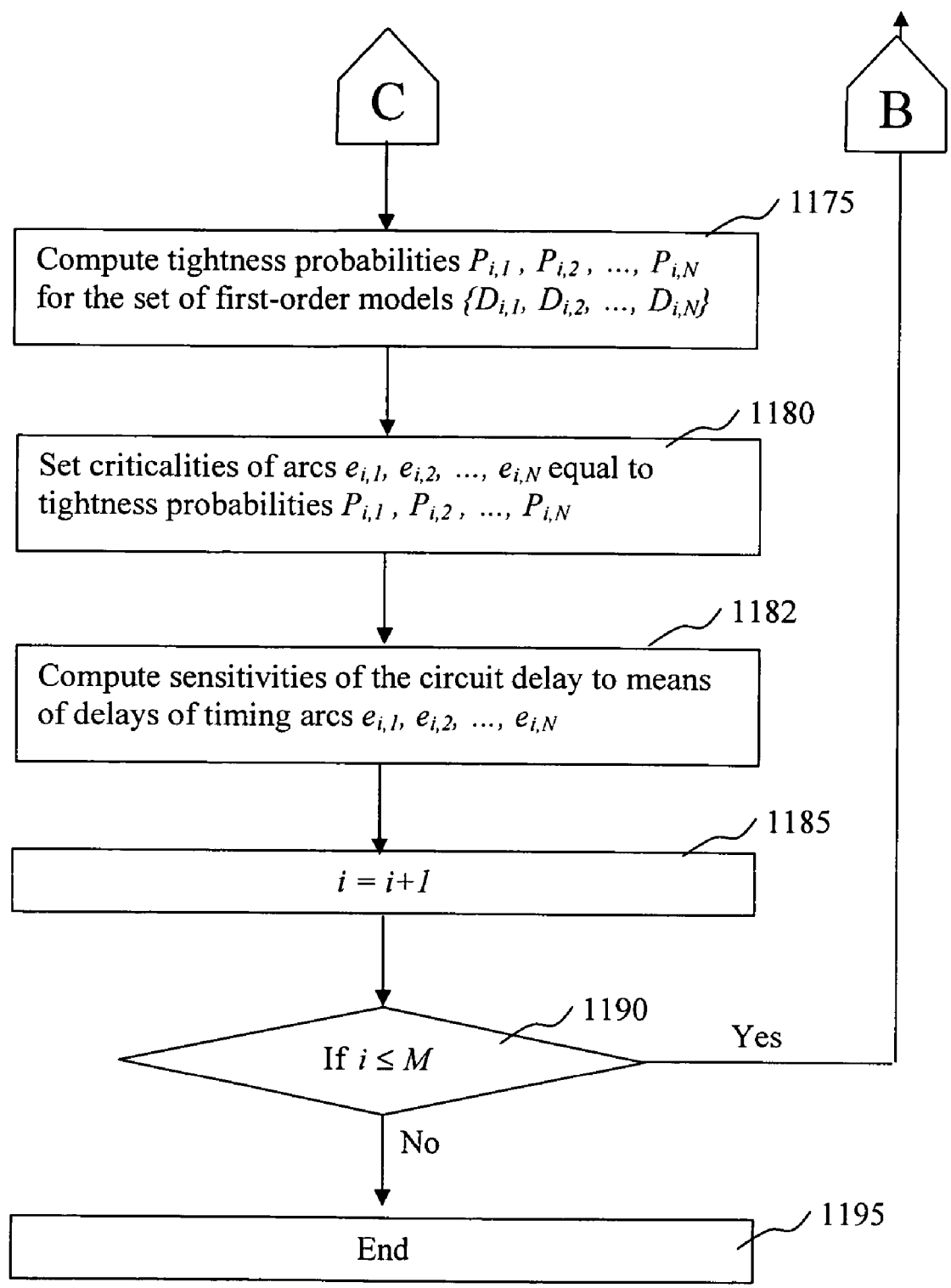

FIG. 11 is a flow methodology 1100 for computing criticalities of timing arcs for a timing graph, an example of which is shown in FIG. 9. A start block 1110 passes control to a function block 1115.

The function block 1115 performs parameterized statistical timing analysis that computes arrival and required arrival times for each vertex of the timing graph. The function block 1115 passes control to a function block 1120.

The function block 1120 constructs cutsets of the timing graph covering all the timing arcs included in the timing graph. This can be done, for example, by the methodology 800. Other appropriate methodologies can be used. The cutsets may be constructed all at once and then processed, or constructed and processed one at a time. The function block 1120 passes control to a function block 1125.

The function block 1125 sets the variable M equal to the number of cutsets constructed by the function block 1120. The function block 1125 passes control to a function block 1130.

The function block 1130 initializes the counter of cutsets i to 1 and passes control to a function block 1135.

The function block 1135 selects the i-th cutset $C_i$ from the set of the cutsets constructed by the function block 1120. The function block 1135 passes control to a function block 1140.

The function block 1140 sets N equal to the number of timing arcs in the cutset $C_i$ and passes control to a function block 1145.

The function block 1145 initializes the counter of arcs j in the current cutset to 1 and passes control to a function block 1150.

The function block 1150 selects the j-th timing arc $e_{ij}$ from the cutset $C_i$ and passes control to a function block 1155.

A function block 1155 finds the initial and terminal vertices $V_{init,ij}$ and $V_{term,ij}$ of the timing arc $e_{ij}$ and passes control to a function block 1160.

The function block 1160 computes the first-order linear model of the maximum delay $D_{i,j}$ of the set of all paths going through the timing arc $e_{ij}$ (i.e., the edge slack of $e_{ij}$) as follows:

$$D_{i,j} = T_{AT}(V_{init,ij}) + d(e_{i,j}) - T_{RAT}(V_{term,i,j}) \tag{12}$$

where:

$T_{AT}(V_{init,i,j})$ is the arrival time at the vertex $V_{init,i,j}$ $d(e_{i,j})$ is the delay of the timing arc $e_{ij}$ $T_{RAT}(V_{term,i,j})$ is the required time at the vertex $V_{term,i,j}$.

The function block 1160 passes control to a function block 1165.

The function block 1165 increments the counter of timing arcs j by 1 and passes control to a decision block 1170.

The decision block 1170 determines whether the current value of j is not greater than N, the number of timing arcs in the current cutset $C_i$. If j is not more than N the decision block 1170 passes control to the function block 1150. Otherwise, the decision block 1170 passes control to a function block 1175.

The function block 1175 computes tightness probabilities $P_{i,1}, P_{i,2}, \ldots, P_{i,N}$ for the set of the first order models $\{D_{i,1}, D_{i,2}, \ldots, D_{i,N}\}$. For example, $P_{i,1}$ is the probability that $D_{i,1}$ is the maximum of $\{D_{i,1}, D_{i,2}, \ldots, D_{i,N}\}$. This computation can be done in several ways. One of the possible ways is to use Monte-Carlo technique. Monte-Carlo computation of tightness probabilities can be efficient as it needs to be applied only as many times as the number of cutsets which is equal to the depth of the timing graph. The function block 1175 passes control to a function block 1180.

The function block 1180 sets criticalities of the timing arcs $e_{i,1}, e_{i,2}, \ldots, e_{i,N}$ of the current cutset $C_i$ equal to the tightness probabilities $P_{i,1}, P_{i,2}, \ldots, P_{i,N}$ computed by the function block 1175. The function block 1180 passes control to a function block 1185.

The function block 1185 increments the counter of cutsets i by 1 and passes control to a decision block 1190.

The decision block 1190 determines whether the current value of i is not more than number of cutsets M. If the current value of i is not more than M the decision block 1190 passes control to the function block 1135 to process the next cutset. Otherwise, the decision block 1190 passes control to the end block 1190.

It may not be necessary to separate the computation of the cutsets of a timing graph and the computation of the criticalities of timing arcs as has been described above by means of separate methodologies 800 and 1100. Methodologies 800, 1100 can be combined so that the criticalities of timing arcs belonging to a cutset are computed immediately after the construction of that cutset.

Figure 12:
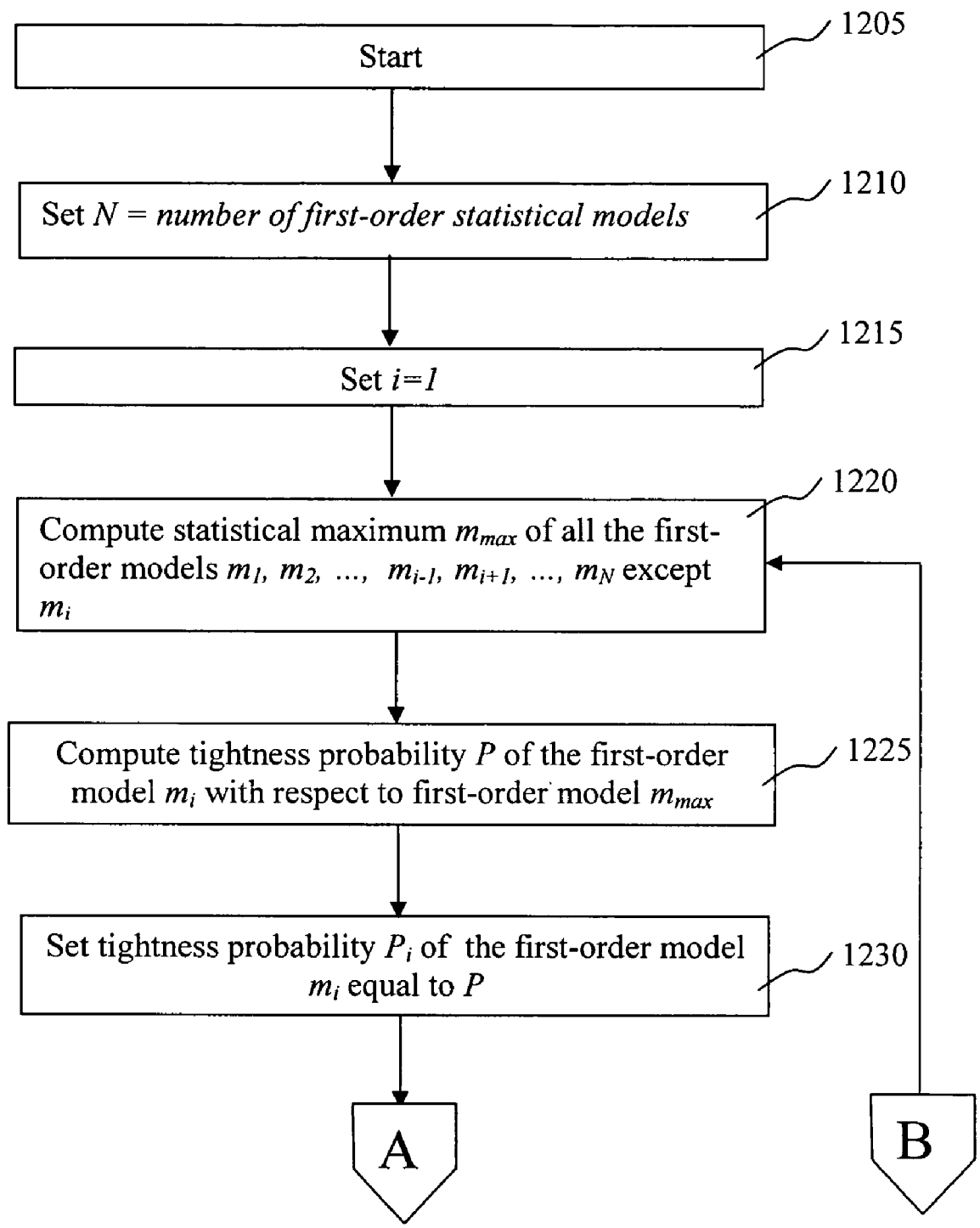
FIG. 12 is a flow chart for computing the tightness probabilities of N first-order linear models.
Figure 12:
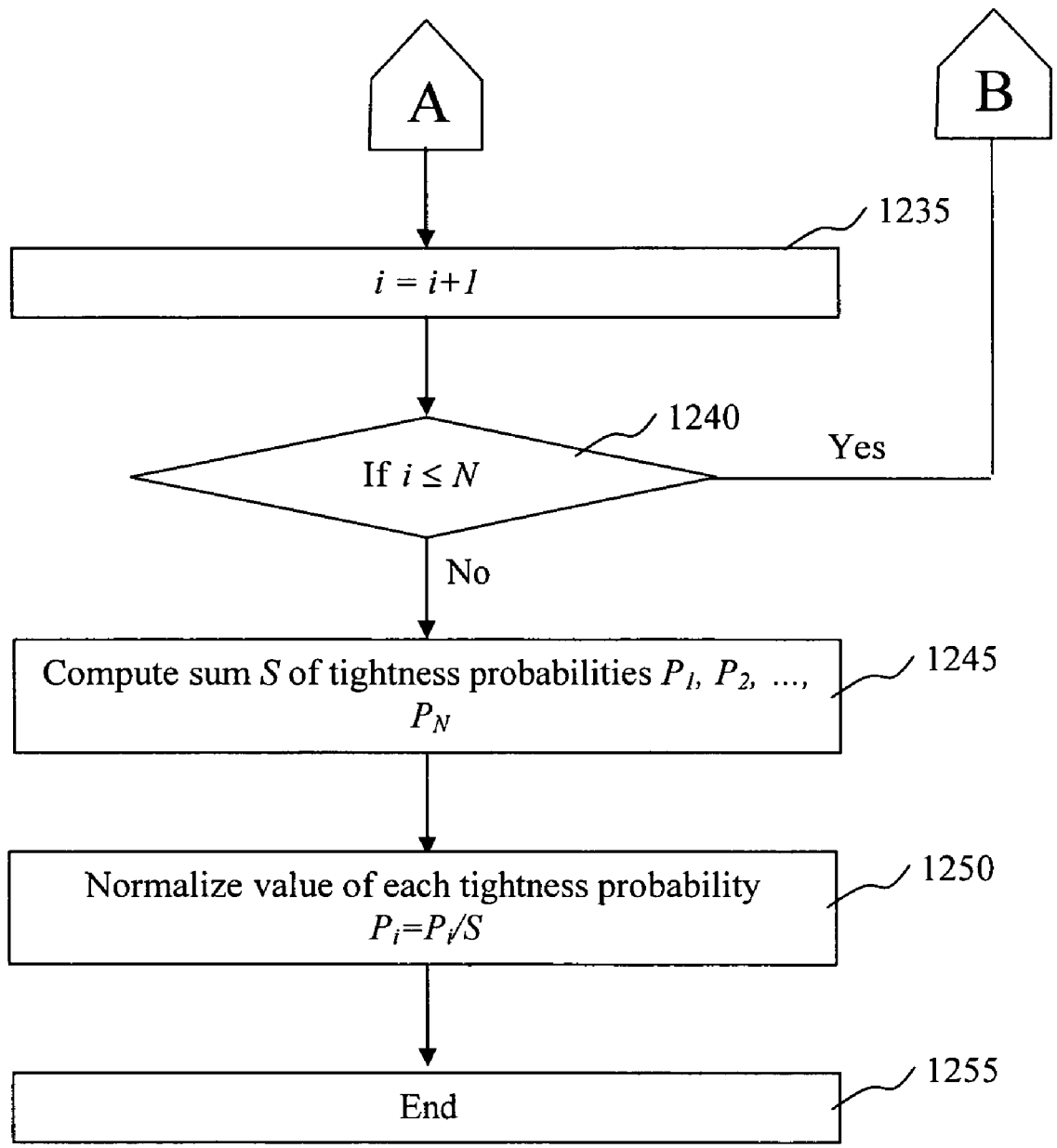

FIG. 12 shows a block diagram of an algorithm 1200 for computing tightness probabilities of a given N first-order linear models $m_1, m_2, \ldots, m_N$. These first-order linear models can be, for example, models of delays, arrival or required times. For computing edge criticalities, they are typically edge slacks of all edges in a cutset.

A start block 1205 of the algorithm 1200 passes control to a function block 1210.

The function block 1210 sets N equal to the number of the given first-order statistical models and passes control to a function block 1215.

The function block 1215 initializes the counter of the first-order linear models i to 1 and passes control to a function block 1220.

The function block 1220 computes the statistical maximum of all the given first-order linear models except the model $m_i$. It means computing the statistical maximum of N−1 first-order linear models $m_1, m_2, \ldots, m_{i-1}, m_{i+1}, \ldots, m_N$. The result of the computation is the first order-order model $m_{max}$ which is called the complement edge slack of edge i. The function block 1220 passes control to a function block 1225.

The function block 1225 computes tightness probability P that the first-order edge slack model $m_i$ is larger than the first order complement edge slack model $m_{max}$ computed by the function block 1220. The function block 1225 passes control to a function block 1230.

The function block 1230 sets tightness probability $P_i$ of the first-order model $m_i$ equal to the value of P computed by the function block 1225 and passes control to a function block 1235.

The function block 1235 increments the counter i of the first-order linear models by 1 and passes control to a decision block 1240.

The decision block 1240 determines whether i is not more than N, the number of the given first-order models. If the current value of i is not more than N the decision block 1240 passes control to the function block 1220. Otherwise it passes control to a function block 1245.

The function block 1245 computes the sum S of tightness probabilities $P_1, P_2, \ldots, P_N$ of the first-order linear models $m_1, m_2, \ldots, m_N$ and passes control to a function block 1250. Theoretically, S should be equal to 1.0, but due to numerical round-off or other approximations, it may not be equal to 1.0.

The function block 1250 normalizes values of each tightness probability $P_i$ by dividing it by S. This normalization can improve accuracy of the computation by ensuring that the sum of the tightness probabilities is 1. The function block 1250 passes control to an end block 1255.

The methodology 1200 can require $O(N^2)$ applications of the binary statistical maximum operation. In another embodiment, criticalities can be computed in linear time O(N) by partitioning a given set of first-order linear models into a hierarchical nested system of subsets having $2, 4, 8, \ldots, 2^{\log N}$ elements; building a binary partition tree of this hierarchical partitioning; precomputing the statistical maximum for each of the subsets starting from subsets having 2 elements, then going to 4 element subsets and so on and so forth; and traversing the binary partition tree and computing the statistical maximum for complementary subsets and the required tightness probabilities during this traversal.

Without any loss of generality, for brevity, it is assumed that the number N of first-order linear models $m_1, m_2, \ldots, m_N$ for which criticalities is desired to be computed is a power of 2:

$$N=2^n \quad (13)$$

Figure 13:
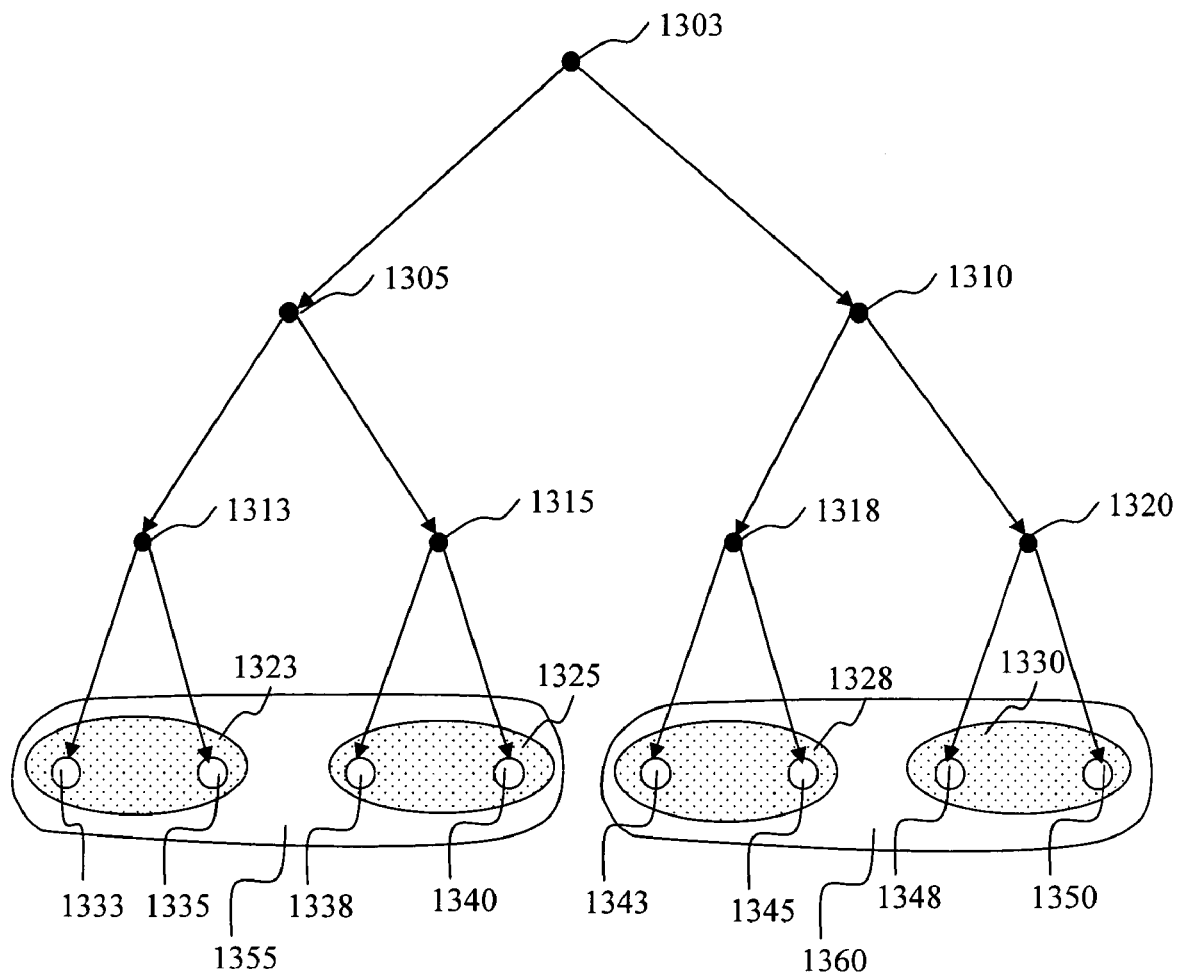
FIG. 13 shows an example of a binary partition tree for a set of first-order models.

FIG. 13 shows an ordered binary tree 1300 for hierarchical balanced partitioning of a set of 8 first-order linear models $\{m_1, m_2, m_3, m_4, m_5, m_6, m_7, m_8\}$. The tree has a root node 1303 and leaf nodes 1333, 1335, 1338, 1340, 1343, 1345, 1348, 1350 representing schematically the given first-order linear models $\{m_1, m_2, m_3, m_4, m_5, m_6, m_7, m_8\}$. The set of the leaf nodes is partitioned into subsets 1323, 1325, 1328, 1330 at the first level of partitioning. Tree nodes 1313, 1315, 1318, 1320 correspond to these subsets $\{\{m_1, m_2\}, \{m_3, m_4\}, \{m_5, m_6\}, \{m_7, m_8\}\}$. The set of the subsets of the first level is partitioned into two subsets 1355, 1360 of the second level. Tree nodes 1305, 1310 correspond to these subsets $\{\{\{m_1, m_2\}, \{m_3, m_4\}\}, \{\{m_5, m_6\}, \{m_7, m_8\}\}\}$ of the second level.

Figure 14:
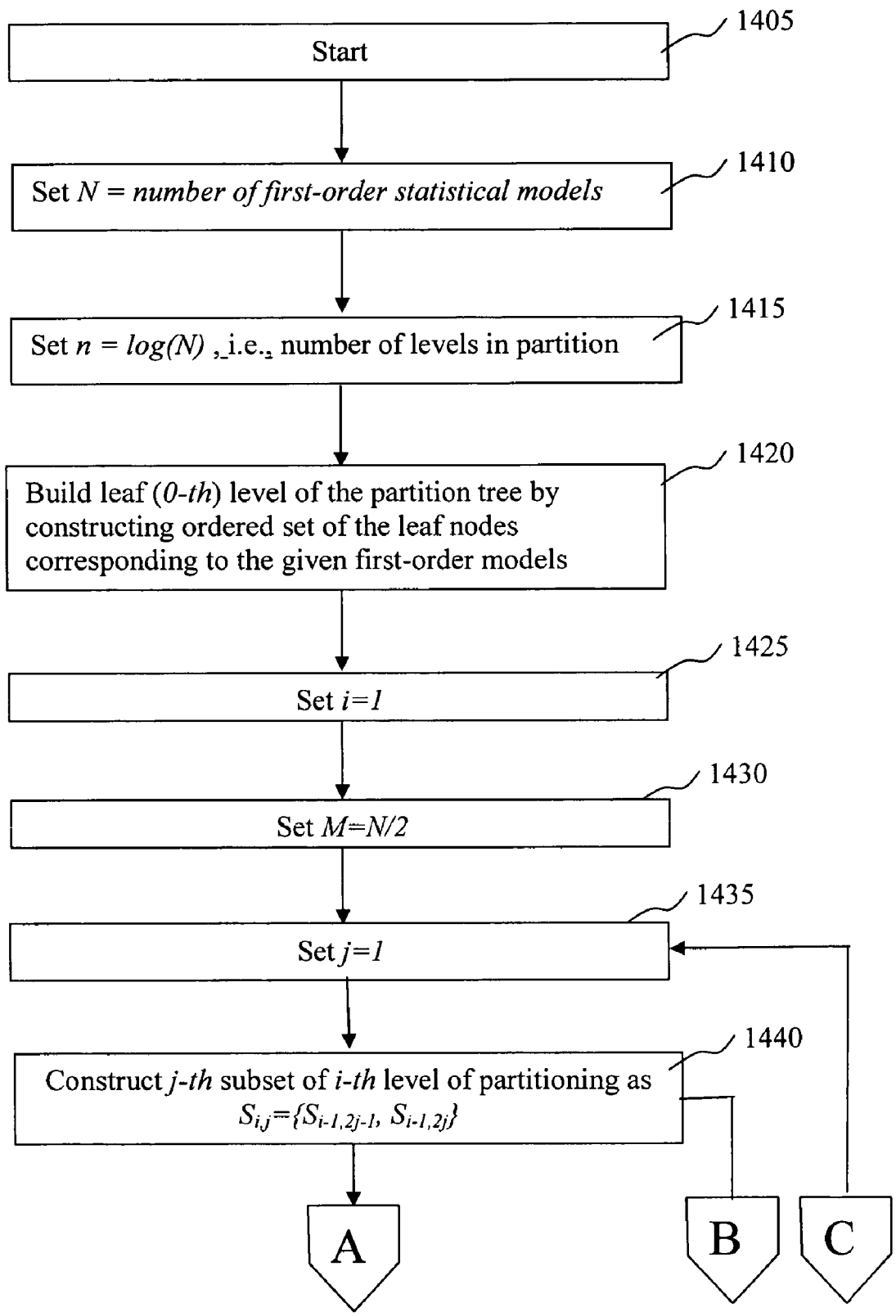
FIG. 14 is a flow chart for computing the tightness probabilities for N first-order models using a binary partition tree, an example of which is illustrated in FIG. 13.
Figure 14:
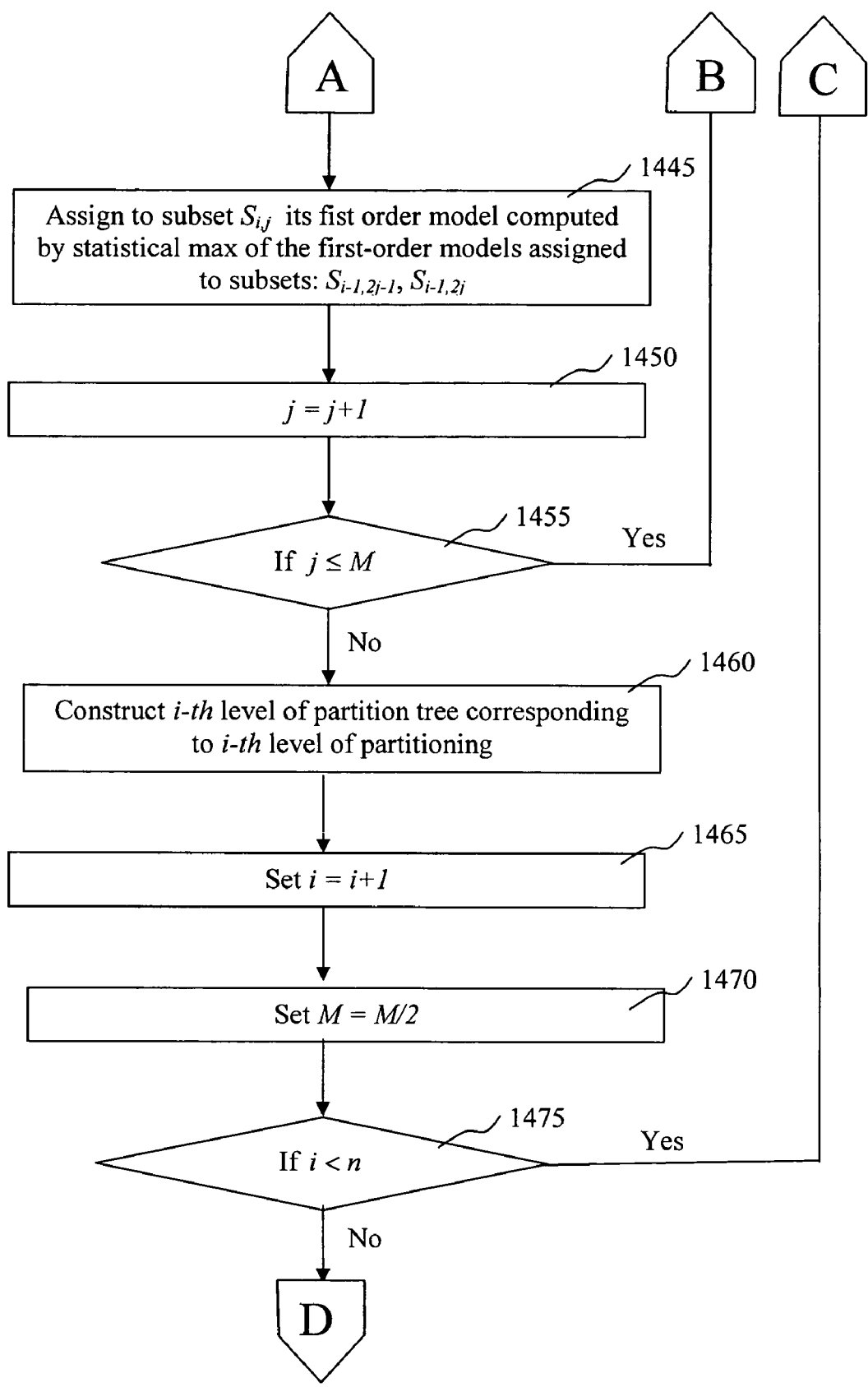
Figure 14:
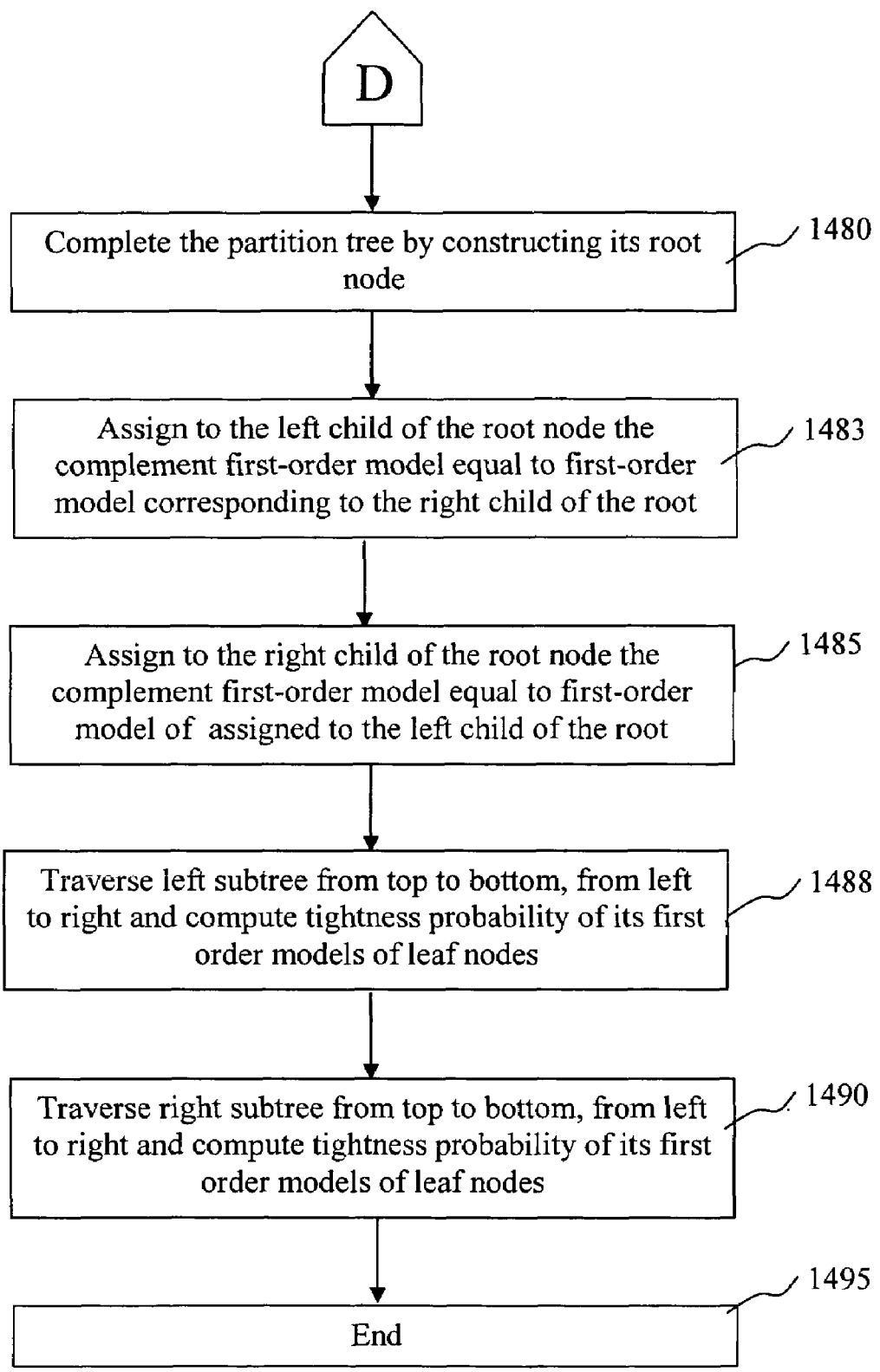

FIG. 14 shows a block diagram of a flow diagram 1400 for computing tightness probabilities for the given N first-order edge slack linear models. The inventors have assumed that the number of the given first-order edge slack models is a power of 2, but the method can trivially be adapted to any number of first-order edge slack models.

A start block 1405 passes control to a function block 1410.

The function block 1410 sets N equal to the number of the given first-order linear edge slack models for which tightness probabilities are desired to be computed. The function block 1410 passes control to a function block 1415.

The function block 1415 computes the number of levels in the partition tree as:

$$n=\log(N) \quad (14)$$

The computation is exact due to the assumption that number of given first order models is a power of 2 (e.g., N is a power of 2). However, the methodology 1400 can be extended to handle arbitrary number of the first-order models. The function block 1415 passes control to a function block 1420.

The function block 1420 builds the leaf (e.g., lowest) level of the partition tree and constructs an ordered set of leaf nodes corresponding to the given first-order linear models. The function block 1420 passes control to a function block 1425.

The function block 1425 sets a counter of partitioning levels (e.g., partition tree levels) i to 1 and passes control to a function block 1430.

The function block 1430 sets the number of subsets at the current level of partitioning (e.g., nodes on the current level of the partition tree) M=N/2 and passes control to a function block 1435.

The function block 1435 initializes the counter j of subsets at the current level of partitioning to 1 and passes control to a function block 1440.

The function block 1440 constructs j-th subset of i-th level of partitioning as follows:

$$S_{i,j} = \{S_{i-1,2j-1}, S_{i-1,2j}\} \quad (15)$$

This subset $S_{i,j}$ is constructed by including into it two subsets $S_{i-1,2j-1}$, $S_{i-1,2j}$ from the partitioning of the previous level. The subsets $S_{i-1,2j-1}$, $S_{i-1,2j}$ are taken according to the order of the subsets at the previous level of partitioning. The function block 1440 passes control to a function block 1445.

The function block 1445 computes the first-order linear model $m_{i,j}$ of the constructed subset $S_{i,j}$ and assigns it to this subset. This first-order model $m_{i,j}$ is computed by calculating statistical maximum of the first-order linear models $m_{i-2j-1}$, $m_{i-2j}$ corresponding to the subsets $S_{i-1,2j-1}$, $S_{i-1,2j}$ used for constructing the subset $S_{i,j}$. The first-order linear model $m_{i,j}$ is the first-order linear model of the statistical maximum of all the first-order linear models contained in a subset $S_{i,j}$. The function block 1445 passes control to a function block 1450.

The function block 1450 increments current value of the counter of subsets j by 1 and passes control to a decision block 1455.

The decision block 1455 determines whether j is not greater than M, the number of subsets at the current partition level. If j is not greater than the number of subsets at the current level of partitioning, the decision block 1455 passes control to the function block 1440 to construct the next subset on the current level of partitioning. Otherwise, control is passed to a function block 1460.

The function block 1460 constructs i-th level of the partitioning tree corresponding to i-th level of partitioning. This construction can be done during construction of the subsets. However, in a preferred embodiment, the inventors have separated the construction of tree nodes from the construction of subsets for better clarity. The function block 1460 passes control to a function block 1465.

The function block 1465 increments the counter of partitioning levels i by 1 and passes control to a function block 1470.

The function block 1470 computes the number of subsets M at the next level of partitioning as M=M/2 and passes control to a decision block 1475.

The decision block 1475 determines whether i is less than the number of partitioning levels n. If i is less than n the decision block 1475 passes control to a function block 1435 to construct the next partition level. Otherwise, the control is passed to a function block 1480.

The function block 1480 completes construction of the partition tree by adding root node to the tree and passes control to function block 1483.

The function block 1483 assigns to the left child of the root node the complement first-order linear model $m_{1,compl}$ equal to the first-order linear model $m_{right}$ of the subset corresponding to the right child of the root node. This complement model is equal to the first-order linear model of the statistical maximum of the subset complementary to the subset corresponding to the left child. The function block 1483 passes control to a function node 1485.

The function block 1485 assigns to the right child of the root node the complement first-order model $m_{r,coml}$ equal to the first-order linear model $m_{left}$ of the subset corresponding to the left child of the root node. This complement model is equal to the first-order linear model of the statistical maximum of the subset complementary to the subset corresponding to the right child. The function block 1485 passes control to a function block 1488.

The function block 1488 traverses the left subtree of the partition tree from top to bottom and computes the tightness probabilities for its leaf nodes. The traversal methodology 1500 is set forth below with respect to FIG. 15. The function block 1488 passes control to a function block 1490.

The function block 1490 traverses the right subtree of the partition tree from top to bottom and computes the tightness probabilities for its leaf nodes. The function block 1490 passes control to an end block 1495.

Figure 15:
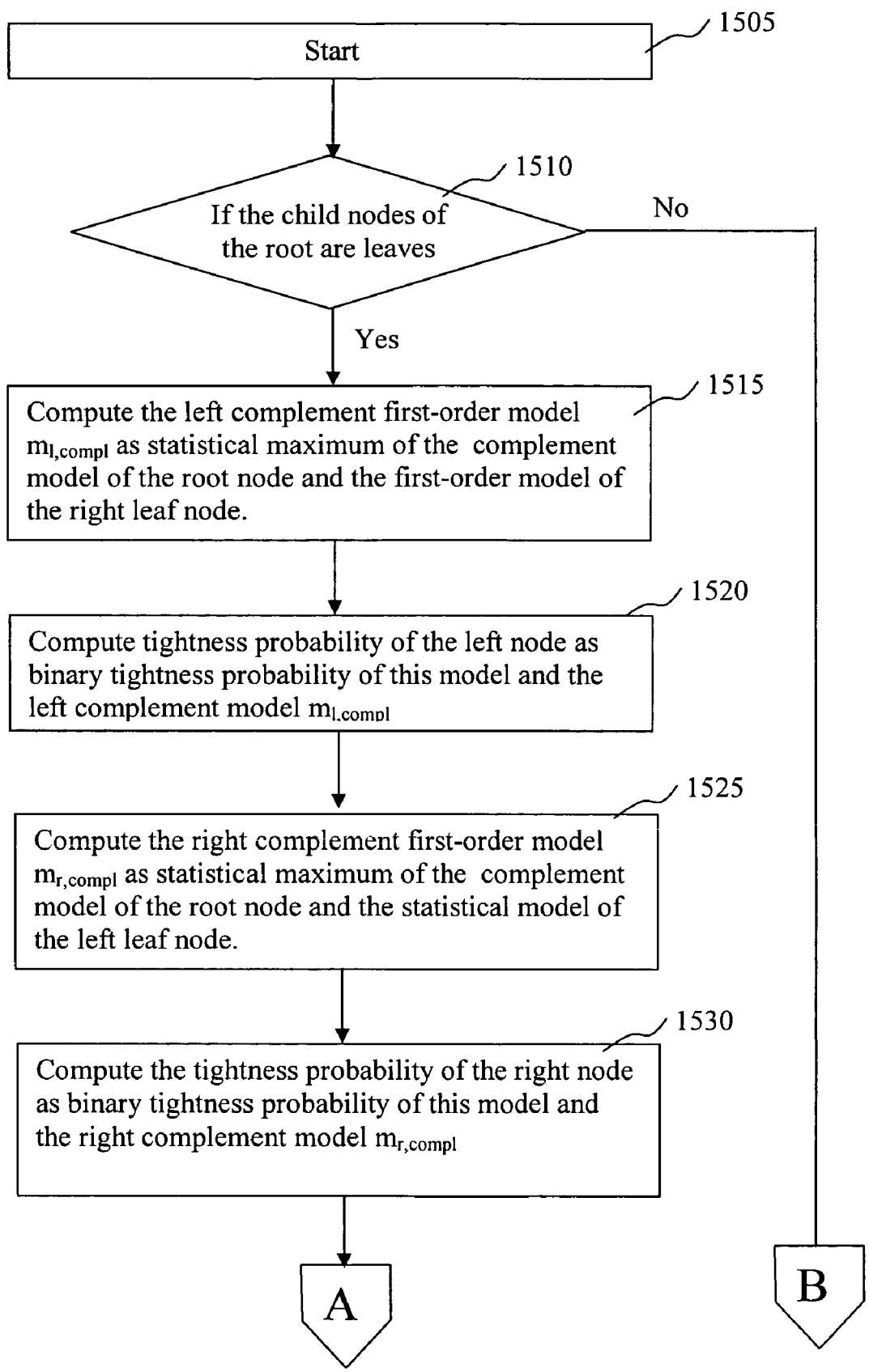
FIG. 15 is a flow chart for traversing the partition tree, an example of which is shown in FIG. 13, and to compute tightness probabilities.
Figure 15:
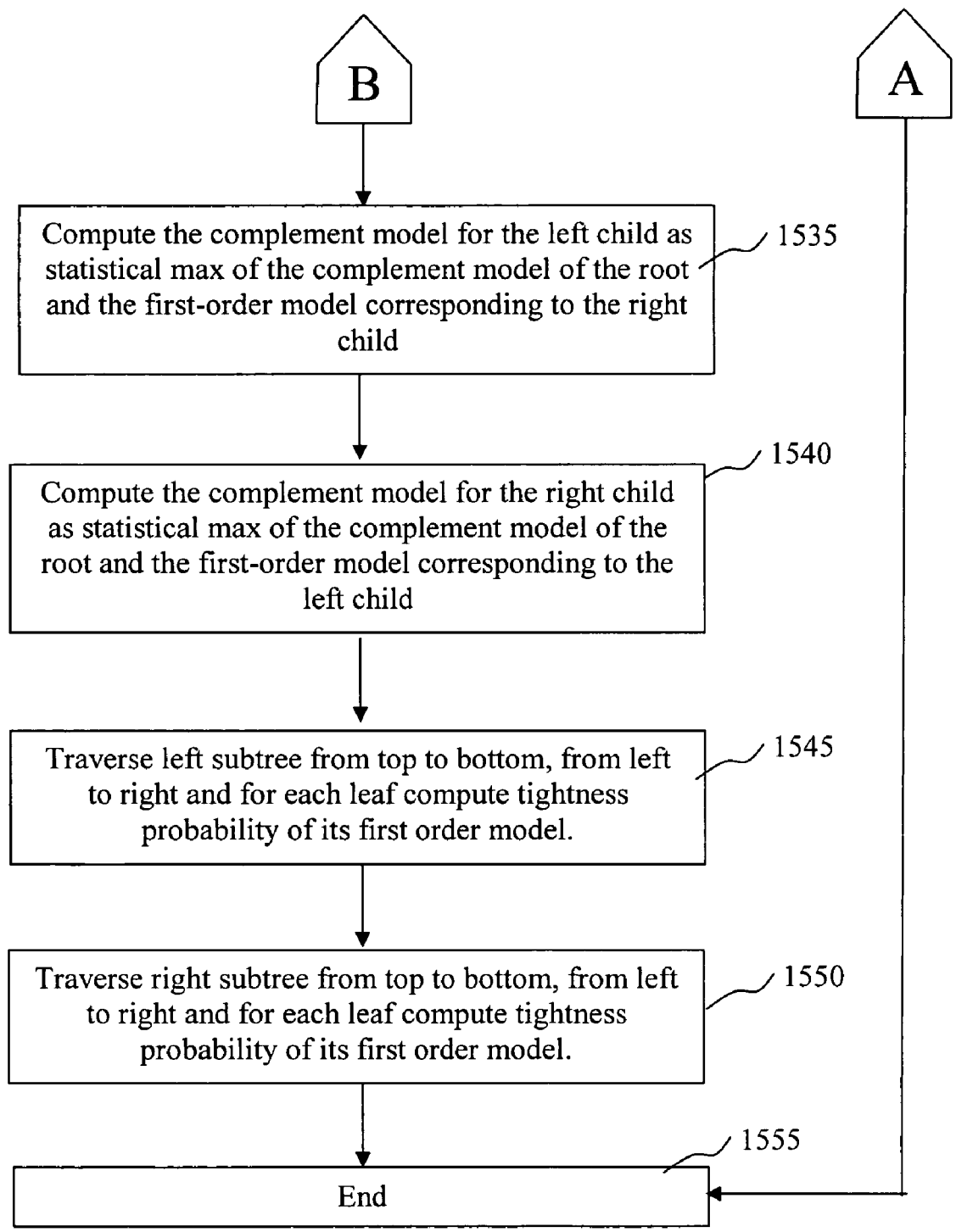

FIG. 15 illustrates a flow methodology 1500 for traversing a partition subtree and computing tightness probabilities of the first-order models corresponding to its leaf nodes. The methodology 1500 has recursive structure. That is, the methodology invokes itself for traversing lower level subtrees. The methodology 1500 takes into consideration the subsets complementary to the subsets corresponding to the nodes of the partition subtree. The methodology 1500 computes first-order linear models of the statistical maximum of the elements of complementary subsets. The first-order linear models of the complementary subsets are called complement first-order linear models or complement edge slacks.

The methodology 1500 assumes that the root of the subtree has the complement first-order model assigned prior to invoking the methodology 1500. This is done either by the methodology 1400 which invokes the methodology 1500 or by the methodology 1500 before it invokes itself recursively.

A start block 1505 passes control to a decision block 1510.

The decision block 1510 determines whether the child nodes of the root node are leaves. If the child nodes are leaves the decision block 1510 passes control to a function block 1515 to process leaf nodes. Otherwise, it passes control to a function block 1535.

The function block 1515 computes the left complement first-order linear model $m_{1,compl}$ as statistical maximum of the complement model $m_{root,compl}$ of the root node and the first-order model $m_{leaf.right}$ of the right leaf node. The function block 1515 passes control to a function block 1520.

The function block 1520 computes tightness probability for the first-order model $m_{leaf.left}$ of the left leaf node as binary tightness probability of this first-order linear model $m_{leaf.left}$ and the left complement first-order model $m_{1,compl}$. The function block 1420 passes control to a function block 1425.

The function block 1525 computes the right complement first-order linear model $m_{r,compl}$ as statistical maximum of the complement model $m_{root,compl}$ of the root node and the first-order model $m_{leaf.left}$ of the left leaf node. The function block 1525 passes control to a function block 1530.

The function block 1530 computes tightness probability for the first-order linear model $m_{leaf.right}$ of the right leaf node as binary tightness probability of this first order-model $m_{leaf.right}$ and the right complement first-order linear model $m_{r,compl}$. The function block 1530 passes control to an end block 1555.

The function block 1535 computes the complement first-order linear model m1,compl for the left child node as statistical maximum of the complement model $m_{root,comp}$ of the root node and the first-order linear model $m_{right}$ of the subset corresponding to the right child of the root node. The function block 1535 passes control to a function block 1540.

The function block 1540 computes the complement first-order linear model $m_{r,coml}$ for the right child node as statistical maximum of the complement model $m_{root,comp}$ of the root node and the first-order linear model $m_{left}$ of the subset corresponding to the left child of the root node. The function block 1540 passes control to a function block 1545.

The function block 1545 traverses the left subtree of the partition tree from top to bottom and computes tightness probabilities for its leaf nodes. The traversal is performed by recursively invoking the methodology 1500. The function block 1545 passes control to a function block 1550.

The function block 1550 traverses the right subtree of the partition tree from top to bottom and computes tightness probabilities for its leaf nodes. The traversal is performed by recursively invoking the algorithm 1500. The function block 1550 passes control to an end block 1555.

The method is efficient and correctly takes into account inherent correlations. All sources of variation impacting the performance of the circuit are simultaneously considered. The resulting criticality probabilities are exploited during various design tasks such as optimization, layout, buffer insertion and routing, whether by manual or automated techniques.

Figure 16:
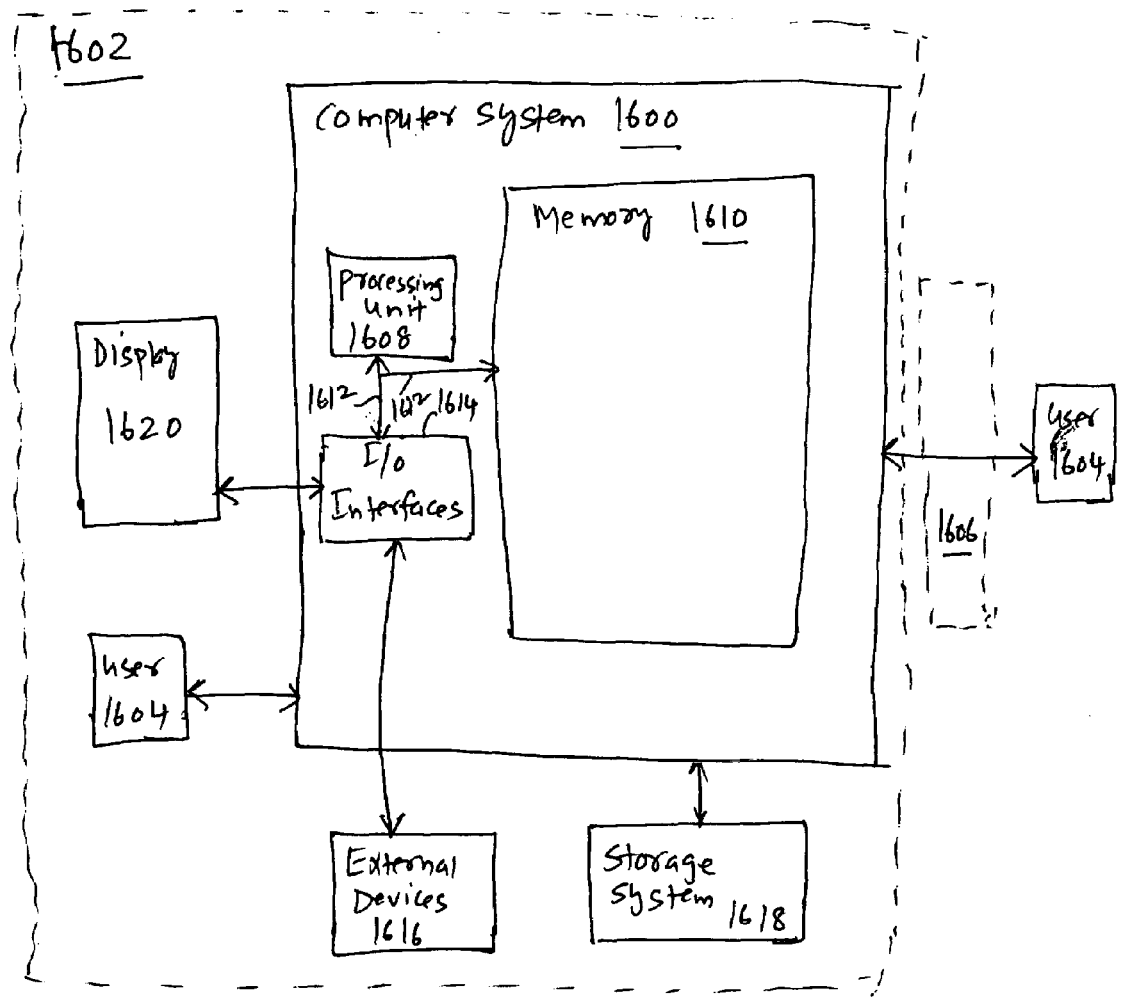
FIG. 16 is a computer system for implementing the various aspects of the invention.

FIG. 16 is a computer system for implementing the various aspects of the invention.

Computer system 1600 is provided in a computer infrastructure 1602. Computer system 1600 is intended to represent any type of computer system capable of carrying out the teachings of the present invention. For example, computer system 1600 can be a laptop computer, a desktop computer, a workstation, a handheld device, a server, a cluster of computers, etc. It should be appreciated that a user 1604 can access computer system 1600 directly, or can operate a computer system that communicates with computer system 1600 over a network 1606 (e.g., the Internet, a wide area network (WAN), a local area network (LAN), a virtual private network (VPN), etc). In the case of the latter, communications between computer system 1600 and a user-operated computer system can occur via any combination of various types of communications links. For example, the communication links can comprise addressable connections that can utilize any combination of wired and/or wireless transmission methods. Where communications occur via the Internet, connectivity can be provided by conventional TCP/IP sockets-based protocol, and an Internet service provider can be used to establish connectivity to the Internet.

Computer system 1600 is shown including a processing unit 1608, a memory 1610, a bus 1612, and input/output (I/O) interfaces 1614. Further, computer system 1600 is shown in communication with external devices/resources 1616 and one or more storage systems 1618. In general, processing unit 1608 executes computer program code, such as for computing edge criticalities, that is stored in memory 1610 and/or storage system(s) 1618. While executing computer program code, processing unit 1608 can read and/or write data, to/from memory 1610, storage system(s) 1618, and/or I/O interfaces 1614. Bus 1612 provides a communication link between each of the components in computer system 1600. External devices/resources 1616 can comprise any devices (e.g., keyboard, pointing device, display (e.g., display 1620), printer, etc.) that enable a user to interact with computer system 1600 and/or any devices (e.g., network card, modem, etc.) that enable computer system 1600 to communicate with one or more other computing devices.

Computer infrastructure 1602 is only illustrative of various types of computer infrastructures that can be used to implement the present invention. For example, in one embodiment, computer infrastructure 1602 can comprise two or more computing devices (e.g., a server cluster) that communicate over a network (e.g., network 1606) to perform the various process steps of the invention. Moreover, computer system 1600 is only representative of the many types of computer systems that can be used in the practice of the present invention, each of which can include numerous combinations of hardware/software. For example, processing unit 1608 can comprise a single processing unit, or can be distributed across one or more processing units in one or more locations, e.g., on a client and server. Similarly, memory 1610 and/or storage system(s) 1618 can comprise any combination of various types of data storage and/or transmission media that reside at one or more physical locations. Further, I/O interfaces 1614 can comprise any system for exchanging information with one or more external devices/resources 1616. Still further, it is understood that one or more additional components (e.g., system software, communication systems, cache memory, etc.) not shown in FIG. 16 can be included in computer system 1600. However, if computer system 1600 comprises a handheld device or the like, it is understood that one or more external devices/resources 1616 (e.g., display 1620) and/or one or more storage system(s) 1618 can be contained within computer system 1600, and not externally as shown.

Storage system(s) 1618 can be any type of system (e.g., a database) capable of providing storage for information under the present invention. To this extent, storage system(s) 1618 can include one or more storage devices, such as a magnetic disk drive or an optical disk drive. In another embodiment, storage system(s) 1618 can include data distributed across, for example, a local area network (LAN), wide area network (WAN) or a storage area network (SAN) (not shown).

Moreover, although not shown, computer systems operated by user 1604 can contain computerized components similar to those described above with regard to computer system 1600.

It should also be understood that the present invention can be realized in hardware, software, a propagated signal, or any combination thereof. Any kind of computer/server system(s)—or other apparatus adapted for carrying out the methods described herein—is suitable. A typical combination of hardware and software can include a general purpose computer system with a computer program that, when loaded and executed, carries out the respective methods described herein. Alternatively, a specific use computer, containing specialized hardware for carrying out one or more of the functional tasks of the invention, can be utilized. The present invention can also be embedded in a computer program product or a propagated signal, which comprises all the respective features enabling the implementation of the methods described herein, and which—when loaded in a computer system—is able to carry out these methods.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

The present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid state memory, magnetic tape, removable computer diskette, random access memory (RAM), read-only memory (ROM), rigid magnetic disk and optical disk. Current examples of optical disks include a compact disk-read only disk (CD-ROM), a compact disk-read/write disk (CD-R/W), and a digital versatile disk (DVD).

Computer program, propagated signal, software program, program, or software, in the present context mean any expression, in any language, code or notation, of a set of instructions intended to cause. a system having an information processing capability to perform a particular function either directly or after either or both of the following: (a) conversion to another language, code or notation; and/or (b) reproduction in a different material form.

While the description of the present invention provided herein focused on the max operation, it is to be appreciated that one of ordinary skill in the art can apply the teaching to a min operation. Moreover, while the description of the present invention provided herein focused on the computation of the latest arrival time, it is to be appreciated that one of ordinary skill in the art can apply the teaching to a computation of the earliest arrival time. Further, while the description of the present invention provided herein focused on combinational circuits, it is to be appreciated that one of ordinary skill in the art can apply the teaching to sequential circuits. Additionally, while the description of the present invention provided herein focused on the case when a gate delay is a separable function, it is to be appreciated that one of ordinary skill in the art can apply the teaching to a case when a gate delay is a non-separable function.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative methods embodying the principles of the invention. Similarly, it will be appreciated that any flow charts, flow diagrams, state transition diagrams, pseudo-code, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method for determining criticality probability of an edge of a timing graph of a circuit, comprising:

forming a directed acyclic timing graph corresponding to a circuit being timed;

performing statistical timing of the circuit;

for each edge of interest, defining a cutset that divides the timing graph into a plurality of parts;

wherein a first part of the plurality of parts includes a source node of the timing graph and a second part of the plurality of parts includes a sink node of the timing graph;

determining an edge slack for each edge in the cutset;

computing a statistical maximum of all edge slacks in the cutset;

inferring edge criticality probabilities of each edge from the statistical maximum; and wherein an early mode statistical edge slack is a statistical sum of an early mode source node statistical arrival time, a negative of an early mode sink node statistical required arrival time, and an early mode delay of the edge.

2. A method for determining criticality probability of an edge of a timing graph of a circuit, comprising:

forming a directed acyclic timing graph corresponding to a circuit being timed;

performing statistical timing of the circuit;

for each edge of interest, defining a cutset that divides the timing graph into a plurality of parts;

wherein a first part of the plurality of parts includes a source node of the timing graph and a second part of the plurality of parts includes a sink node of the timing graph;

determining an edge slack for each edge in the cutset;

computing a statistical maximum of all edge slacks in the cutset;

inferring edge criticality probabilities of each edge from the statistical maximum; and wherein a late mode statistical edge slack is a statistical sum of a late mode source node statistical arrival time, a negative of a late mode sink node statistical required arrival time, and a late mode delay of the edge.

3. A method of optimizing timing characteristics of a circuit, comprising:

determining criticality probability of an edge of a timing graph during parameterized statistical static timing analysis;

wherein the determining comprises:

forming a directed acyclic timing graph corresponding to a circuit being timed;

performing statistical timing of the circuit;

for each edge of interest, defining a cutset configured to divide the timing graph into a plurality of parts;

determining an edge slack for each edge in the cutset;

computing a statistical maximum of all edge slacks in the cutset; and inferring edge criticality probabilities of each edge from the statistical maximum;

using the criticality probability to guide optimization of timing characteristics of a circuit; and wherein a statistical late mode edge slack is a sum of a late mode source node arrival time, a negative of late mode sink node required arrival time, and a late mode delay of the edge.

4. A method of optimizing timing characteristics of a circuit, comprising:

determining criticality probability of an edge of a timing graph during parameterized statistical static timing analysis;

wherein the determining comprises:

forming a directed acyclic timing graph corresponding to a circuit being timed;

performing statistical timing of the circuit;

for each edge of interest, defining a cutset configured to divide the timing graph into a plurality of parts;

determining an edge slack for each edge in the cutset;

computing a statistical maximum of all edge slacks in the cutset; and inferring edge criticality probabilities of each edge from the statistical maximum;

using the criticality probability to guide optimization of timing characteristics of a circuit; and wherein a statistical early mode edge slack is a sum of an early mode source node arrival time, a negative of early mode sink node required arrival time, and an early mode delay of the edge.

\* \* \* \* \*